United States Statutory Invention Registration [19]

[11] Reg. Number: H706

Takahashi et al. [43] Published: Nov. 7, 1989

[54] SILVER HALIDE COLOR PHOTOSENSITIVE MATERIALS

[75] Inventors: Osamu Takahashi; Nobuo Furutachi; Masakazu Morigaki, all of Kanagawa, Japan

[73] Assignee: Fuji Photo Film Co., Ltd., Minami Ashigara, Japan

[21] Appl. No.: 237,205

[22] Filed: Aug. 29, 1988

[30] Foreign Application Priority Data

Aug. 28, 1987 [JP] Japan ..... 62-214681

[51] Int. Cl.[4] ..... G03C 1/08

[52] U.S. Cl. ..... 430/551; 430/546; 430/636

[56] References Cited

FOREIGN PATENT DOCUMENTS

| | | |
|---|---|---|
| 705617 | 3/1968 | Belgium . |
| 228655 | 7/1987 | European Pat. Off. . |
| 1572264 | 3/1970 | Fed. Rep. of Germany . |
| 1524760 | 5/1967 | France . |
| 62-125351 | 6/1987 | Japan . |
| 62-143048 | 6/1987 | Japan . |
| 62-173470 | 7/1987 | Japan . |

OTHER PUBLICATIONS

Patent Abstracts of Japan, vol. 12, No. 16, (p. 656) Jan. '88.

Patent Abstracts of Japan, vol. II, No. 342 (p. 635) Nov. '87.

*Primary Examiner*—John F. Terapane
*Assistant Examiner*—Richard Treanor
*Attorney, Agent, or Firm*—Sughrue, Mion, Zinn, Macpeak & Seas

[57] ABSTRACT

A silver halide color photosensitive material is disclosed, characterized in that a lipophilic fine grain dispersed in at least one hydrophilic colloidal layer formed on a support contains at least one compound of formula (I) and at least one compound of formula (II):

$$R_1—SO_2.M_1 \quad (I)$$

$$R_2—SO_3.M_2 \quad (II)$$

wherein each of $R_1$ and $R_2$ represents an aliphatic group having 8 or more carbon atoms, an aromatic group having 8 or more carbon atoms or a heterocyclic group having 8 or more carbon atoms; each of $M_1$ and $M_2$ represents a hydrogen atom or an inorganic or organic salt-forming atom or atomic group; also $M_1$ represents a protective group to be hydrolyzed with alkali; and sodium dodecylbenzenesulfonate is excluded from the compounds of formula (II). The combined use of the compounds of formulae (I) and (II) can effectively control the formation of stains on the processed white ground after the lapse of time without substantially lowering the maximum color density.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SILVER HALIDE COLOR PHOTOSENSITIVE MATERIALS

FIELD OF THE INVENTION

The present invention relates to silver halide color photosensitive materials, and more particularly to silver halide color photosensitive materials which contain a dispersion containing minute and stable lipophilic fine grains and couplers to have the high color density and an improvement in the degree of stains generated in the non-colored part (which is referred to as the white ground) after the lapse of time.

BACKGROUND OF THE INVENTION

In general, the formation of color photographic images is carried out by a method comprising developing the exposed silver halide grains using an aromatic primary amine compound as a developing agent and coupling the thus obtained oxidation product of the aromatic primary amine compound with color-forming couplers to give a yellow dye image, a magenta dye image and a cyan dye image.

The above method usually employs cyan couplers, magenta couplers and yellow couplers.

Although color photographic images obtained by using these couplers are usually preserved as records for a long time or may be exhibited, the white grounds of these dye images are not always stable to light, heat and moisture. While the color photographic images are long exposed to light, preserved under the circumstance of high temperature and high humidity, or held in albums for many years, the white grounds thereof are sometimes discolored to cause the deterioration of image quality (which is called stains hereinafter).

There may be considered many possible sources of the stains. For example, the following sources (1) and (2) are presumed.

(1) The couplers themselves decompose to make the white ground yellow (which is called Y stain).

(2) The developing agent remaining in an emulsion film after development processing is gradually oxidized with oxygen in the air and so on to be reacted with couplers to form dyes and then cause the stains. In this case, the use of a magenta coupler brings about the magenta stain. The magenta has the high relative luminosity to man to cause the lowering of image quality exceedingly.

Particularly, pyrazoloazole type magenta couplers show the better sharpness than 5-pyrazolone type magenta couplers both in the shorter wavelength side and the longer wavelength side, and so the former is most preferable in respect of color reproduction but unfavorable to have such a defect that the magenta color stain due to the above-mentioned source (2) easily occurs.

Moreover, there is another difficult problem as to a developing bath. The developing bath is seldom newly prepared in every development processing. In practice, a developing solution is supplied again according to the amount used for development. However, the solution composition is not maintained by adding only water used in development.

Namely, the developing solution usually consists of a color developing agent, a stop solution, a bleaching solution, a fixing or blix solution and so on. The composition of the developing solution is changed by the decomposition of the developing agent in the long processing kept at a high treating temperature of 31° C. to 43° C., the oxidation of said agent by contact with air, the accumulation of substances eluted from photosensitive materials, the carrying over of the developing solution attached to photosensitive materials to the next bath, and so on to bring about what is called a running solution. So the shortage of some agents used must be supplied and substances not wanted must be removed from the bath to regenerate the solution. However, this is not satisfactory.

When photosensitive materials are developed in such a running solution, the components of the developing solution remain in the photosensitive materials to easily cause the above mentioned color stains in particular.

The conventionally known methods of preventing various stains include those of using alkylhydroquinones (e.g., U.S. Pat. Nos. 3,935,016 and 3,960,570), chroman, coumaran (e.g., U.S. Pat. No. 2,360,290), phenolic compounds (e.g., JP-A No. 51-9449), and sulfinic acid polymers (e.g., JP-A No. 56-151937). (The term "JP-A" as used herein means an "unexamined published Japanese patent application"). These compounds were recognized to have a little effect on the stains formed by processing, but showed substantially no effect on those caused by moisture and heat given after color developing processing. Also, JP-A No. 56-67842 discloses that photosensitive materials contain compounds obtained by the reaction of nitrogen-containing organic bases or quaternary-nitrogen atom-containing compounds with sulfinic acid, an object of which is to provide silver halide photosensitive materials which are stable and suitable for rapid processing by adding and mixing aromatic primary amine compounds as precursors and another object of which is to stabilize the photographic property of the photosensitive materials before development. The objects thereof are essentially different from those of the present invention as stated hereinafter.

On the other hand, JP-A No. 62-143048 discloses that sulfinic acid compounds containing oil-soluble groups are effective to the above-mentioned stains. It is certain that said sulfinic acid compounds are effective, but have the following problems:

(1) the color density is lowered by the addition of sulfinic acid compounds containing oil-soluble groups; and (2) the stable emulsions cannot easily be obtained since the solubility of sulfinic acid compounds in auxiliary solvents (low boiling-point solvents) such as ethyl acetate to be used in emulsion dispersion is low.

SUMMARY OF THE INVENTION

The object of the present invention is to provide silver halide color photosensitive materials which result in color photographs having high color image density and little stains in the non-colored part (white ground).

Another object of the present invention is to provide silver halide color photosensitive materials which result in color photographs having good color-reproducibility and high image quality.

A still further object of the present invention is to provide silver halide color photosensitive materials having a highly stable emulsion.

The other objects of the invention will be illustrated more in detail by the following description and Examples.

The inventors has eagerly studied to find that the above-mentioned objects of the present invention can be obtained by silver halide color photosensitive materials, characterized in that lipophilic fine grains dispersed in at least one hydrophilic colloidal layer on a support contain at least one of the compounds represented by the following general formula (I) and at least one of the compounds represented by the following general formula (II):

$$R_1—SO_2·M_1 \quad (I)$$

$$R_2—SO_3·M_2 \quad (II)$$

wherein each of $R_1$ and $R_2$ represents an aliphatic, aromatic or heterocyclic group having 8 or more carbon atoms; each of $M_1$ and $M_2$ represents a hydrogen atom or an inorganic or organic salt-forming atom or atomic group; also $M_1$ represents a protective group to be hydrolyzed with alkali, and sodium dodecylbenzenesulfonate is excluded from the compounds of formula (II).

In the present invention, the favorable compounds of formula (II) particularly have a solubility of no more than 5% by weight in water at 25° C. Accordingly, sodium dodecylbenzene sulfonate is unfavorable for the present invention because of the high solubility in water.

DETAILED DESCRIPTION OF THE INVENTION

The following is the more detailed explanation as to each group of the compounds represented by formulae (I) and (II).

An aliphatic group in $R_1$ and $R_2$ represents a straight or branched chain or cyclic alkyl, alkenyl or alkynyl group having 8 or more carbons, which may be substituted with a substituent. An aromatic group in $R_1$ and $R_2$ may represent either one of a carbon-cyclic aromatic group (e.g., phenyl, naphthyl) and a heterocyclic aromatic group (e.g., furyl, thienyl, pyrazolyl, pyridyl, indolyl) having 8 or more carbons, which may have a single or condensed ring structure (e.g., benzofuryl, phenanthridinyl). Moreover, these aromatic rings may have substituents.

A heterocyclic group in $R_1$ and $R_2$ preferably represents a 3 to 10 membered ring structure group having 8 or more carbons in total, which consists of carbon, oxygen, nitrogen, sulfur or hydrogen as a hetero atom wherein the heterocyclic ring itself may be saturated or unsaturated, and further which may be substituted with a substituent (e.g., coumanyl, pyroridyl, pyrolinyl, morpholinyl).

Moreover, the above mentioned substituent represents alkyl, halogen, alkoxy, aryloxy, hydroxy, cyano, nitro, alkylthio, arylthio, acyloxy, sulfonyloxy, alkoxycarbonyloxy, acylamino, sulfonamido, imido, amino, anilino, ureido, alkoxycarbonylamino, aryloxycarbonylamino, a nitrogen heterocyclic group (e.g., N-pyrazolyl, N-imidazolyl, N-triazolyl, N-pyroridinyl), alkoxycarbonyl, acyl, aryloxy-carbonyl, carbamoyl, sulfamoyl, sulfamoylamino, alkylsulfonyl, arylsulfonyl, and a heterocyclic thio group.

An atom or atomic group to form an inorganic or organic salt in $M_1$ and $M_2$ represents an inorganic cation, for example, Li, Na, K, Ca, or Mg, or an organic cation, for example, triethyl ammonium, methyl ammonium, tetrabutyl ammonium, ammonium, or trimethylbenzyl ammonium.

Also, a preferable protective group to be hydrolyzed with alkali in $M_1$ represents a group to be hydrolyzed in a pH value of 7.5 or more which is represented by the following formula:

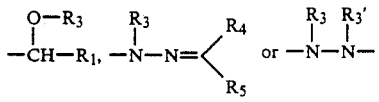

wherein each of $R_3$ and $R_3'$ represents a hydrogen atom, an acyl group (e.g., acetyl, benzoyl); or a sulfonyl group (e.g., methanesulfonyl, benzenesulfonyl); each of $R_4$ and $R_5$ represents a hydrogen atom, an alkyl group (e.g., methyl, butyl, dodecyl, ethoxyethyl) or an aryl group (e.g., phenyl, α-naphthyl, β-naphthyl); and $R_4$ and $R_5$ may form a 4 to 7 membered ring structure (e.g., cyclobutane, cyclopentane, cylohexane, or cycloheptane ring).

The compounds represented by said general formula (I) and (II) have preferably a solubility of no more than 5% by weight in water at 25° C., more preferably, no more than 1% by weight.

The preferable group represented by $R_1$ or $R_2$ of the compounds of formulae (I) and (II) is an aromatic group having 10 or more carbons.

$R_1$ of formula (I) and $R_2$ of formula (II) may be different from each other but preferably are the same.

The most preferable of the compounds of formulae (I) and (II) are those represented by the following general formulae (III) and (III'), respectively:

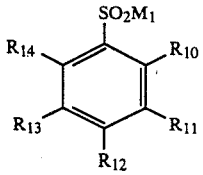

(III)

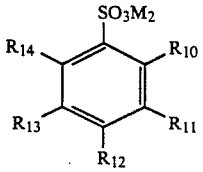

(III')

wherein $R_{10}$, $R_{11}$, $R_{12}$, $R_{13}$ and $R_{14}$ may be the same or different, and each thereof represents a hydrogen atom, an aliphatic group (e.g., methyl, isopropyl, t-butyl, vinyl, benzyl, octadecyl, cyclohexyl), an aromatic group (e.g., phenyl, pyridyl, naphthyl), a heterocyclic group (e.g., piperidyl, pyranyl, furanyl, chromanyl), a halogen atom (e.g., chlorine, bromine), $—SR_{15}—$, $—OR_{15}$,

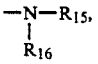

an aliphatic acyl group or an aromatic acyl group (e.g., acetyl, benzoyl), an alkoxycarbonyl group (e.g., methoxycarbonyl, butoxycarbonyl, cyclohexylcarbonyl, octyloxycarbonyl), an aryloxycarbonyl group (e.g., phenyloxycarbonyl, naphthyloxycarbonyl), a sulfonyl group (e.g., ethanesulfonyl, benzenesulfonyl), a sulfonamido group (e.g., methanesulfonamido, benzenesulfonamido), a sulfamoyl group, a ureido group, a urethane group, a carbamoyl group, a sulfo group, a carboxyl group, a nitro group, a cyano group, an alkoxalyl group (e.g., methoxalyl, isobutoxalyl, octyloxyxalyl, benzoyloxyxalyl), an aryloxalyl group (e.g., phenoxyxalyl, naphthoxyxalyl), a sulfonyloxy group (e.g., methanesulfonyloxy, sulfonyloxy, benzenesulfonyloxy), $—P(R_{15})_3$;

$$—\overset{O}{\overset{\|}{P}}(R_{15})_2 \quad —\overset{S}{\overset{\|}{P}}(R_{15})_2$$

$—P(OR_{15})_3$ and a formyl group, wherein each of $R_{15}$ and $R_{16}$ represents a hydrogen atom, an aliphatic group, an alkoxy group or an aromatic group; among which is preferable a group having a sum total of Hammet's $\sigma$ value of 0.5 or more for $—SO_2M_1$, in view of the effect of the present invention.

The typical compounds represented by general formulae (I) and (II) are given as follows.

Compounds of Formula (I)

(I-1)

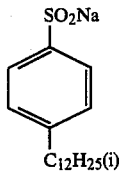

(I-2)

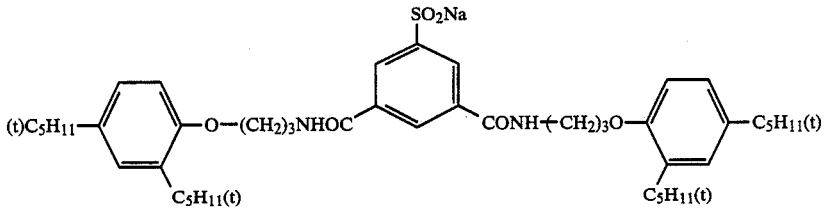

(I-3)

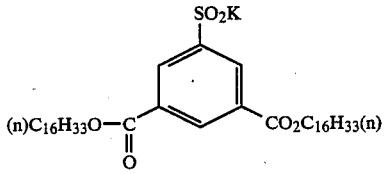

(I-4)

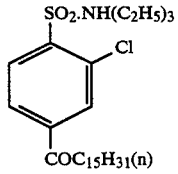

(I-5)

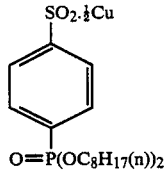

(I-6)

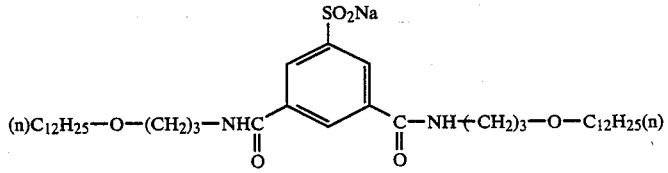

(I-7)

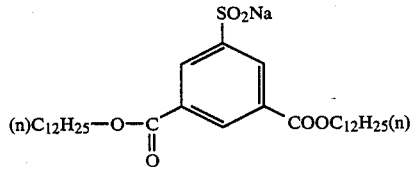

-continued
(I-8)
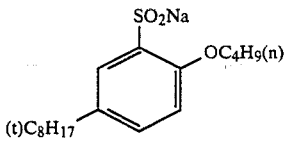
(I-9)
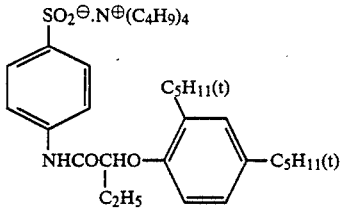
(I-10)
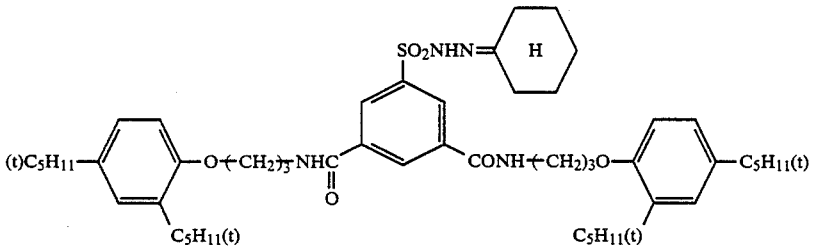
(I-11)
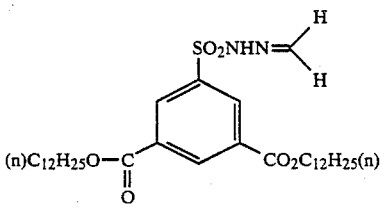
(I-12)
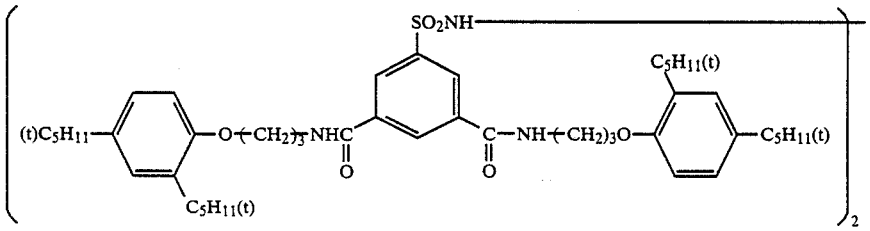
(I-13)
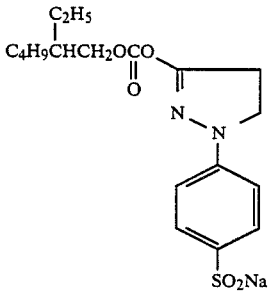
Compounds of Formula (II)
(II-1)
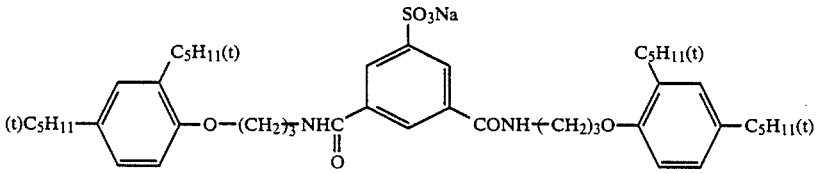

-continued
(II-2)
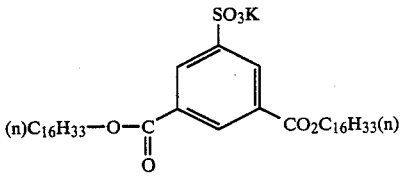
(II-3)
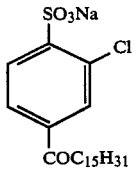
(II-4)
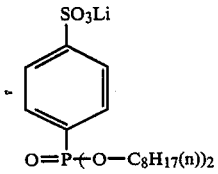
(II-5)
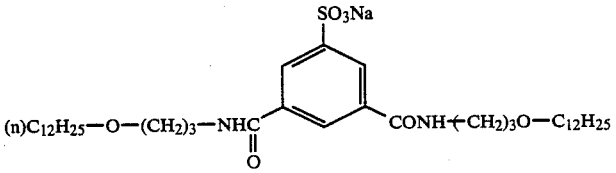
(II-6)
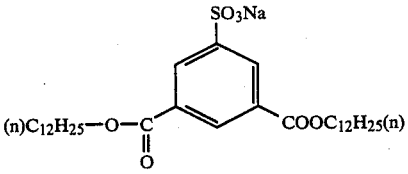
(II-7)
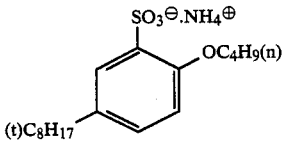
(II-8)
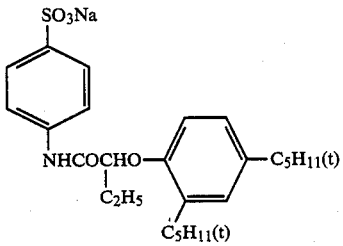
(II-9)
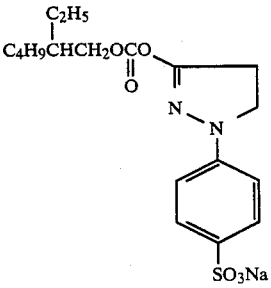

-continued

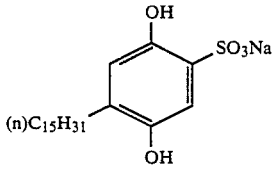

(II-10)

The compounds of formula (I) are disclosed in JP-A No. 62-143048 and the compounds of formula (II) are disclosed in JP A-62-173470.

It was quite unexpected that the combined use of at least one of the compounds of formula (I) and at least one of the compounds of formula (II) results in the good stability of the emulsion, the high color reproducibility, and the decrease of stains in non-image part (white ground), as stated above. Namely, it has never been expected that the employment of sulfinic acid compounds ordinarily containing 0.5 to 2.0% by weight of said sulfinic acid in silver halide color photosensitive materials brought about said excellent properties of the color photosensitive materials by the further addition of the sulfonic acid compounds thereto as a whole.

The amount of the sulfinic acid compounds of formula (I) is preferably 1 to 50 mol %, more preferably 2 to 20 mol % on the basis of the amount of the couplers included in the same layer. In case where they are not existed in the same layer, the amount is based on the amount of the magenta coupler.

The amount of the sulfonic acid compounds of formula (II) is preferably over 2% by weight, more preferably 10 to 200% by weight on the basis of that of the sulfinic acid compounds of formula (I).

The sulfinic acid compounds of formula (I) and the sulfonic acid compounds of formula (II) can be added to the silver halide emulsion layers and the other hydrophilic colloidal layers (intermediate layer, ultraviolet ray absorbing layer, protective layer and so on), more preferably to the same silver halide emulsion layer, and particularly most preferably to the same lipophilic fine grains.

The most preferable compounds to be used with the compounds of formulae (I) and (II) of the present invention are compounds represented by the following general formulae (A-I) or (A-II) which chemically combine with aromatic amine developing agents remaining after color development processing to form chemically inert and substantially colorless compounds:

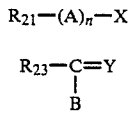

$R_{21}-(A)_n-X$ (A-I)

$R_{23}-C(B)=Y$ (A-II)

wherein each of $R_{21}$ and $R_{22}$ represents an aliphatic group, an aromatic group or a heterocyclic group; n represents an integer of 1 to 0; A represents a group which forms a chemical bond upon reaction with an aromatic amine developing agent; B represents a hydrogen atom, an aliphatic group, an aromatic group, a heterocyclic group, an acyl group or a sulfonyl group; said aliphatic, aromatic and heterocyclic groups have the same definition as given above in the description of formulae (I) and (II); X represents a releasable group upon reaction with an aromatic amine developing agent; Y represents a group to accelerate the addition reaction of the aromatic amine developing agent to the compounds of general formula (A-II); $R_{21}$ and X, and Y and $R_{22}$ or B may be combined with each other to form a ring structure; such rings include 5 to 6 membered carbocyclic or heterocyclic saturated or unsaturated ones.

Typically, the remaining aromatic amine developing agents can be chemically combined by substitution or addition reaction.

The preferable compounds represented by formulae (A-I) and (A-II) are those whose secondary reaction rate constant $K_2$ with p-anisidine (in trioctyl phosphate at 80° C.) range from 1.0 liter/mol·sec to $1\times10^{-5}$ liter/mol·sec.

When $K_2$ is higher than said range, the compounds themselves become unstable and sometimes react with gelatin or water to cause decomposition. On the contrary, when $K_2$ is smaller than said range, the reaction rate of the compounds with the remaining aromatic amine developing agents become low, and so the compounds cannot prevent the side effect of the remaining aromatic amine developing agents. As a result, one object of the present invention will not be attained.

The compounds represented by formulae (A-I) and (A-II) are disclosed, e.g., in JP-A No. 63-158545 and JP-A No. 63-115866.

The amount of the compounds represented by formulae (A-I) and (A-II) is $1\times10^{-1}$ to 10 mol, preferably $3\times10^{-10}$ mol to 5 mol per mol of the amount of the couplers used in the same layer.

The typical compounds represented by formulae (A-I) and (A-II) are given as follows:

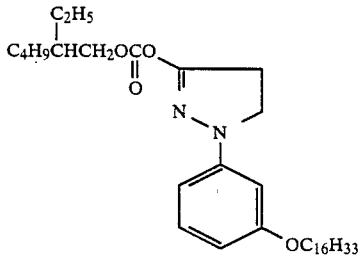

(A-1)

-continued
(A-2)
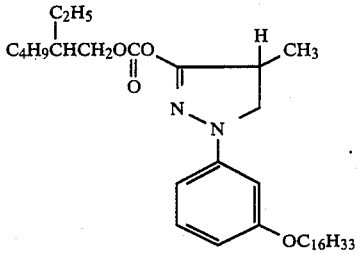
(A-3)
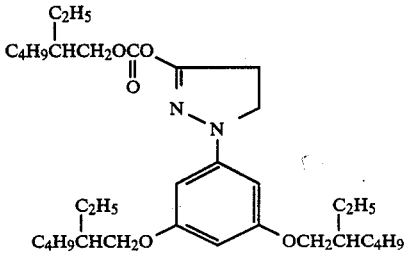
(A-4)
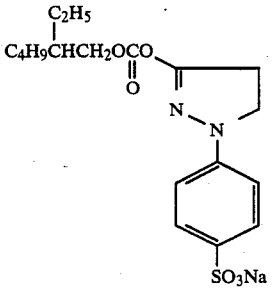
(A-5)
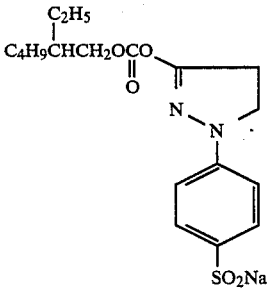
(A-6)
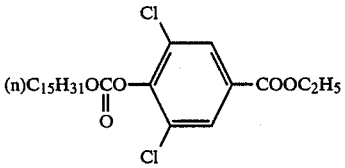
(A-7)
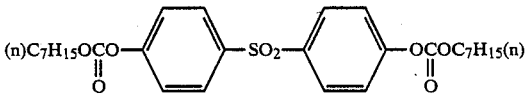
(A-8)
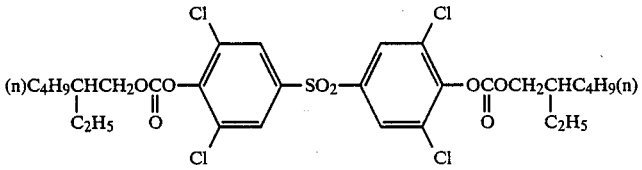

-continued
(A-9)
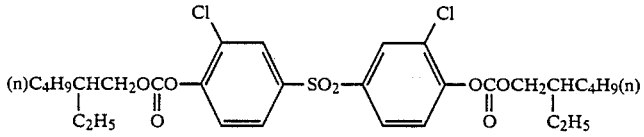
(A-10)
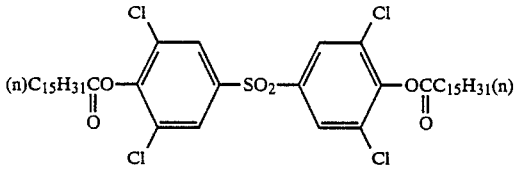
(A-11)
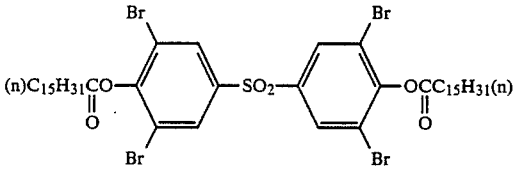
(A-12)
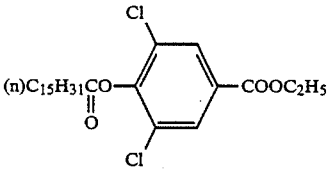
(A-13)
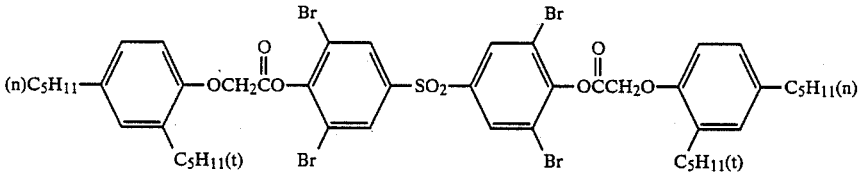
(A-14)
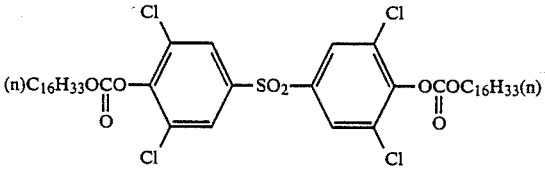
(A-15)
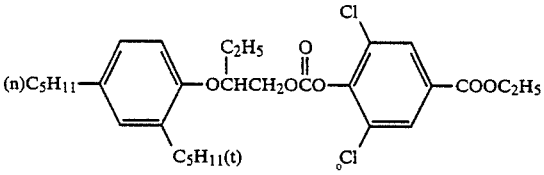
(A-16)
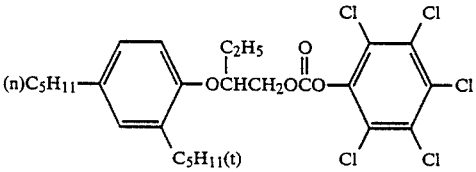
(A-17)
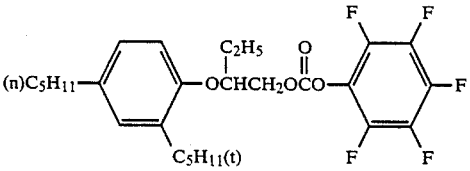

-continued
(A-18)
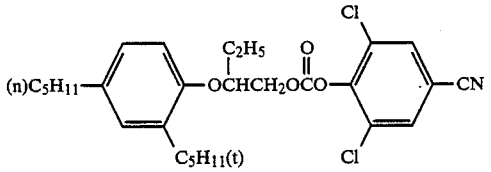
(A-19)
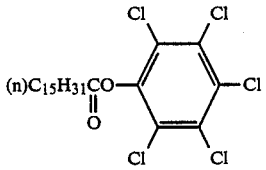
(A-20)
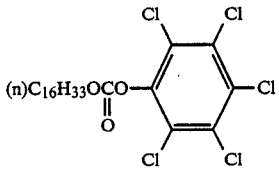
(A-21)
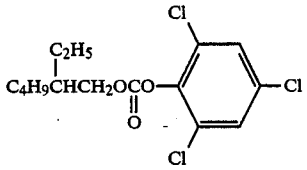
(A-22)
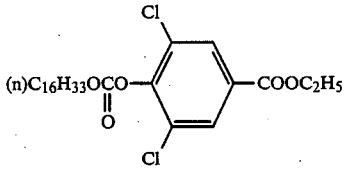
(A-23)
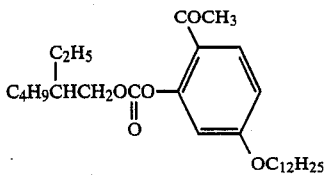
(A-24)
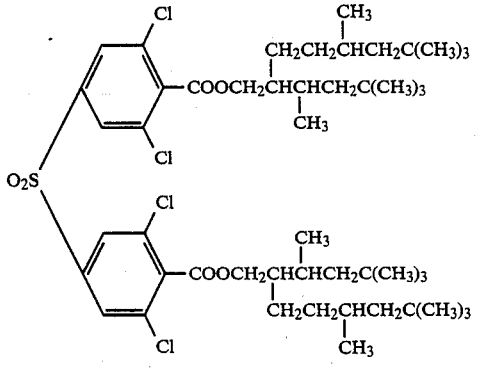
(A-25)
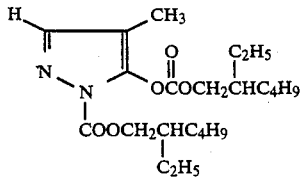

-continued

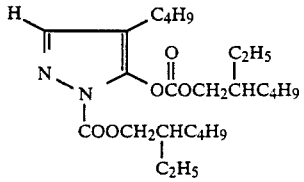
(A-26)

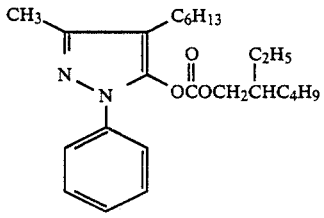
(A-27)

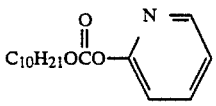
(A-28)

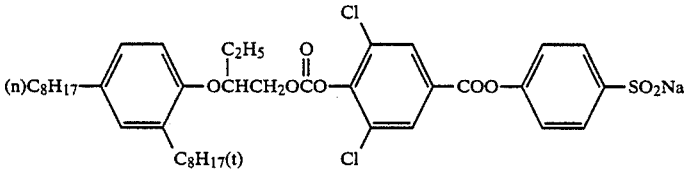
(A-29)

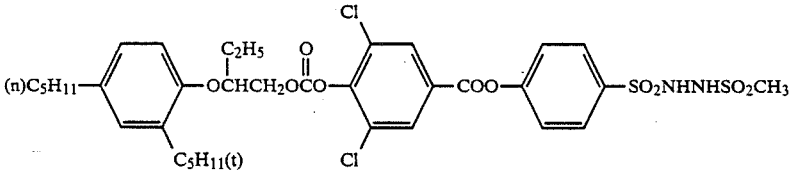
(A-30)

In the present invention, it is preferable to use the combination of a yellow coupler, a magenta coupler and a cyan coupler which have good dispersion resistance and good oil-solubility.

These couplers may be 4 or 2 equivalents on the basis of silver ion and may be in the state of polymer or oligomer. Moreover, the couplers may be used independently or in the combination of two or more.

The preferable couplers to be used in the present invention are represented by the following formulae:

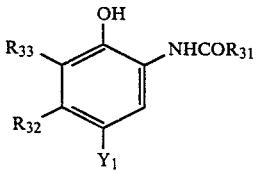
Formula (III)

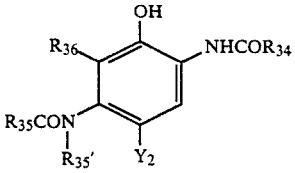
Formula (IV)

-continued

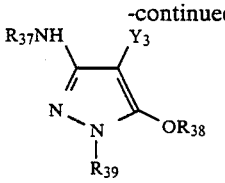
Formula (V)

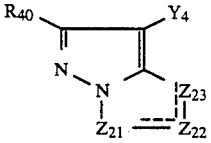
Formula (VI)

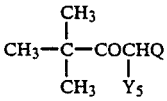
Formula (VII)

wherein each of $R_{31}$, $R_{34}$, and $R_{35}$ represents an aliphatic group, an aromatic group, a heterocyclic group, an aromatic amino group or a heterocyclic amino group; $R_{32}$ represents an aliphatic group; each of $R_{33}$ and $R_{36}$ represents a hydrogen atom, a halogen atom, an aliphatic group, an aliphatic oxy group or an acylamino group; $R_{35}'$ represents a hydrogen atom or has the same definition as given in $R_{35}$; each of $R_{37}$ and $R_{39}$ represents a substituted or unsubstituted phenyl group; $R_{38}$ represents a hydrogen atom, an aliphatic group, an aromatic acyl group or an aliphatic or aromatic sulfonyl group; Q represents a substituted or unsubstituted N-phenylcarbamoyl group; each of $Y_1$, $Y_2$, $Y_3$, $Y_4$ and $Y_5$ represents a hydrogen atom or releasable group (which is referred to as "coupling-off group") in the coupling reaction with an oxidation product of the developing agent.

In the general formulae (III) and (IV), the combination of $R_{32}$ and $R_{33}$ and that of $R_{35}$ and $R_{36}$ may form the 5-, 6- or 7-membered rings.

Further, $R_{31}$, $R_{32}$, $R_{33}$ or $Y_1$; $R_{34}$, $R_{35}$, $R_{36}$ or $Y_2$; $R_{37}$, $R_{38}$, $R_{39}$ or $Y_3$; $R_{40}$, $Z_{21}$, $Z_{22}$ or $Y_4$; Q or $Y_5$ may form a dimer or higher polymeric form.

The above-mentioned aliphatic group represents a straight, branched or cyclic alkyl, alkenyl, or alkynyl group.

In general formula (VI), R40 represents a hydrogen atom or a substituent; each of $Z_{21}$, $Z_{22}$ and $Z_{23}$ represents $$-\overset{\overset{R_{40}}{|}}{C}= ,$$

—N= or —NH—; either one of the bonding of $Z_{22}$–$Z_{23}$ and the bonding of $Z_{21}$–$Z_{22}$ is a double bond and the other is a single bond. When the bonding of $Z_{21}$–$Z_{22}$ is a carbon-carbon double bond, the bonding may be a part of the aromatic ring.

The following is the detailed explanation of said substituents of $R_{40}$.

$R_{40}$ represents a hydrogen atom, a halogen atom, an alkyl group, an aryl group, a heterocyclic group, a cyano group, an alkoxy group, an aryloxy group, a heterocyclic oxy group, an acyloxy group, a carbamoyloxy group, a silyloxy group, a sulfonyloxy group, an acylamino group, an anilino group, a ureido group, an imido group, a sulfamoylamino group, a carbamoylamino group, an alkylthio group, an arylthio group, a heterocyclic thio group, an alkoxycarbonylamino group, an aryloxycarbonylamino group, a sulfonamido group, a carbamoyl group, an acyl group, a sulfamoyl group, a sulfonyl group, a sulfinyl group, an alkoxycarbonyl group or an aryloxycarbonyl group.

The following is the more detailed explanation of the above-mentioned substituents. $R_{40}$ represents a hydrogen atom, a halogen atom (e.g., chlorine, bromine), an alkyl group (e.g., methyl, propyl, iso-propyl, t-butyl, trifluoromethyl, tridecyl, 3-(2,4-di-t-amylphenoxy)propyl, allyl, 2-dodecyloxyethyl, 3-phenoxypropyl, 2-hexylsulfonyl-ethyl, 3-(2-butoxy-5-t-hexylphenylsulfonayl)propyl, cyclopentyl, benzyl), an aryl group (e.g., phenyl, 4-t-butylphenyl, 2,4-di-t-amylphenyl, 4-tetradecanamidophenyl), a heterocyclic group (e.g., 2-furyl, 2-thienyl, 2-pyrimidinyl, 2-benzothiazolyl), a cyano group, an alkoxy group (e.g., methoxy, ethoxy, 2-methoxyethoxy, 2-dodecyloxyethoxy, 2-phenoxyethoxy, 2-methanesulfonylethoxy), an aryloxy group (e.g., phenoxy, 2-methylphenoxy, 2-methoxyphenoxy, 4-t-butylphenoxy), a heterocyclic oxy group (e.g., 2-benzimidazolyloxy), an acyloxy group (e.g., acetoxy, hexadecanoyloxy), a carbamoyloxy group (e.g., N-phenylcarbamoyloxy, n-ethylcarbamoyloxy), a silyloxy group (e.g., trimethylsilyloxy), a sulfonyloxy group (e.g., dodecylsulfonyloxy), an acylamino group (e.g., acetamido, benzamido, tetradecanamido, α-(2,4-di-t-amylphenoxy)butylamido, γ-(3-t-butyl-4-hydroxyphenoxy)butylamido, α-[4-(4-hydroxyphenylsulfonyl)-phenoxy]decanamido), an anilino group (e.g., phenylamino, 2-chloroanilino, 2-chloro-5-tetradecanamidanilino, 2-chloro-5-dodecyloxycarbonylanilino, N-acetylanilino, 2-chloro-5-[α-(3-t-butyl-4-hydroxyphenoxy)dodecaneamido]anilino), a ureido group (e.g., phenylureido, methylureido, N,N-dibutylureido), an imido group (e.g., N-succinimido, 3-benzylhydantoinyl, 4-(2-ethylhexanoylamino)phthalimido), a sulfamoylamino group (e.g., N,N-dipropylsulfamoylamino, N-methyl-N-decylsulfamoylamino), an alkylthio group (e.g., methylthio, octylthio, tetradecylthio, 2-phenoxyethylthio, 3-phenoxypropylthio, 3-(4-t-butylphenoxy)propylthio), an arylthio group (e.g., phenylthio, 2-butoxy-5-t-octylphenylthio, 3-pentadecylphenylthio, 2-carboxyphenylthio, 4-tetradecanamidophenylthio), a heterocyclic thio group (e.g., 2-benzothiazolylthio), an alkoxycarbonylamino group (e.g., methoxycarbonylamino, tetradecyloxycarbonylamino), an aryloxycarbonylamino group (e.g., phenoxycarbonylamino, 2,4-di-tertbutylphenoxycarbonylamino), a sulfonamido group (e.g., methanesulfonamido, hexadecanesulfonamido, benzenesulfonamido, p-toluenesulfonamido, octadecanesulfonamido, 2-methyloxy-5-t-butylbenzenesulfonamido), a carbamoyl group (e.g., N-ethylcarbamoyl, N,N-dibutylcarbamoyl, N-(2-dodecyloxyethyl)carbamoyl, N-methyl-N-dodecylcarbamoyl, N-[3-(2,4-di-tert-aminophenoxy)propyl]carbamoyl), an acyl group (e.g., acetyl, (2,4-di-tert-aminophenoxy)acetyl, benzoyl), a sulfamoyl group (e.g., N-ethylsulfamoyl, N,N-dipropylsulfamoyl, N-(2-dodecyloxyethyl)sulfamoyl, N-ethyl-N-dodecylsulfamoyl, N,N-diethylsulfamoyl), a sulfonyl group (e.g., methanesulfonyl, octanesulfonyl, benzenesulfonyl, toluenesulfonyl, 2-butoxy-5-tert-octylphenylsulfonyl), a sulfinyl group (e.g., octanesulfinyl, dodecylsulfinyl, phenylsulfinyl), an alkoxycarbonyl group (e.g., methoxycarbonyl, butyloxycarbonyl, dodecylcarbonyl, octadecylcarbonyl), or an aryloxycarbonyl group (e.g., phenyloxycarbonyl, 3-pentadecyloxycarbonyl).

The coupling-off groups represented by $Y_1$ to $Y_5$ include a halogen atom (e.g., fluorine, chlorine, bromine), an alkoxy group (e.g., dedecyloxy, dodecyloxycarbonylmethoxy, methoxycarbamoylmethoxy, carboxypropyloxy, methanesulfonyloxy), an aryloxy group (e.g., 4-methylphenoxy, 4-tert-butylphenoxy, 4-methoxyphenoxy, 4methanesulfonylphenoxy, 4-(4-benzyloxyphenylsulfonyl)phenoxy), an acyloxy group (e.g., acetoxy, tetradecanoyloxy, benzoyloxy), a sulfonyloxy group (e.g., methanesulfonyloxy, toluenesulfonyloxy), an amido group (e.g., dichloroacetylamino, methanesulfonylamino), an alkoxycarbonyloxy group (e.g., ethoxycarbonyloxy, benzyloxycarbonyloxy), an aryloxycarbonyloxy group (e.g., phenoxycarbonyloxy), an aliphatic or aromatic thio (e.g., phenylthio, dodecylthio, benzylthio, 2-butoxy-5-tert-octylphenylthio, 2,5-di-octyloxyphenylthio, 2-(2-ethoxyethoxy)-5-tert-octylphenylthio, tetrazolylthio), an imido group (e.g., succinimido, hydantoinyl, 2,4-dioxooxazolydine-3-yl, 3-benzyl-4-ethoxyhydantoin-1-yl), a N-heterocyclic group (e.g., 1-pyrazolyl, 1-benzotriazolyl, 5-chloro-1,2,4-triazole-1-yl), and an aromatic azo group (e.g., phenylazo). These coupling-off groups may include photographically useful groups.

The couplers having photographically useful groups include couplers which release photographically useful fragments such as development accelerators, bleach accelerators, developing agents, silver halide solvents, toning agents, hardening agents, fogging agents, antifoggants, chemical sensitizers, spectral sensitizers, and desensitizers by coupling with oxidation products of color developing agents, colored couplers which have the effect of color correction, and DIR couplers which release development inhibitors along with the process of development to improve sharpness and graininess of image. DIR couplers may be replaced with DIR compounds which cause the coupling reaction with said couplers and oxidation products of developing agents to form colorless compounds and simultaneously release development inhibitors.

DIR couplers include the couplers having inhibitors which are directly bonded to the coupling position and the couplers having inhibitors which are bonded to the coupling position through divalent groups so that the inhibitors are released by intramolecular nucleophilic reaction caused in the groups eliminated by coupling reaction, intramolecular electron-transfer reaction and so on (which are called timing DIR couplers and timing DIR compounds). Also, the inhibitors having good diffusibility and those having little diffusibility can be used independently or in combinations thereof after the elimination.

Of the couplers to be used together with the compounds of general formulae (I) and (II) in combination, magenta couplers are preferable and 5-pyrazolone series couplers and pyrazoloazole series couplers, particularly, represented by formulae (V) and (VI), are more preferable. Moreover, the couplers represented by formula (VI) are the most preferable.

Of the compounds represented by formula (VI), the compounds represented by formulae (VII) or (VIII) are preferable, and particularly, the two-equivalent couplers are more preferable.

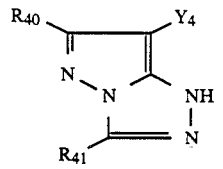

Formula (VII)

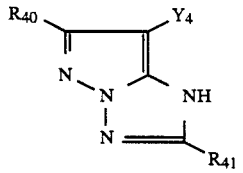

Formula (VIII)

wherein $R_{40}$ and $Y_4$ have the same definition as given in formula (VI), $R_{41}$ has the same definition as $R_{40}$; $R_{40}$ and $R_{41}$ may be the same or different.

Of these, formula (VIII) is more preferable than formula (VII).

The amount of the compounds represented by the formulae (III) to (VIII) is preferably $1\times10^{-3}$ to 1 mol, more preferably $1\times10^{-2}$ to $8\times10^{-1}$ mol per mol of silver halide.

The followings are the examples of the oil-soluble magenta, yellow and cyan couplers to be used in the present invention, which do not limit the scope of the present invention.

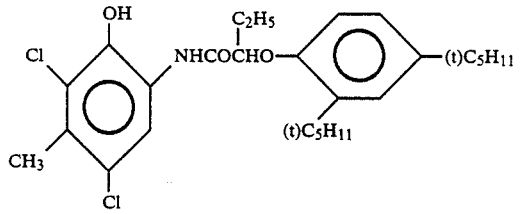

(C-1)

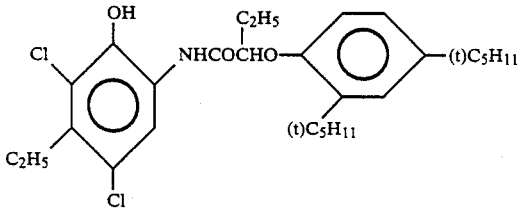

(C-2)

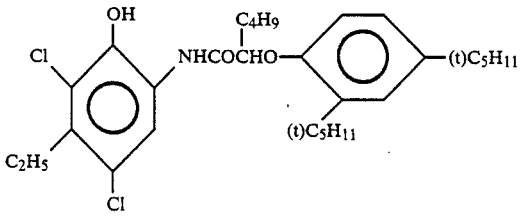

(C-3)

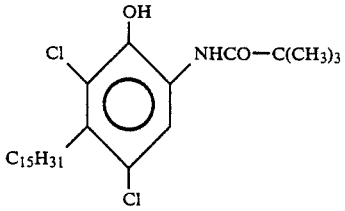

(C-4)

-continued
(C-5)
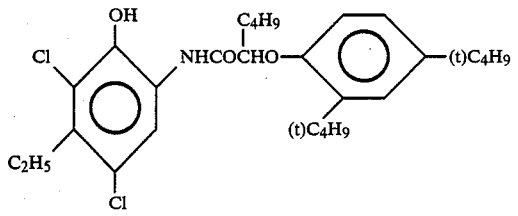
(C-6)
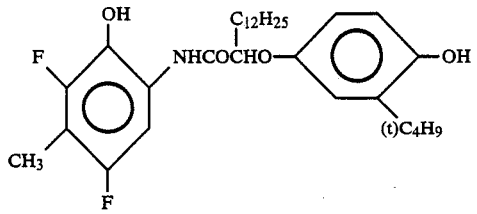
(C-7)
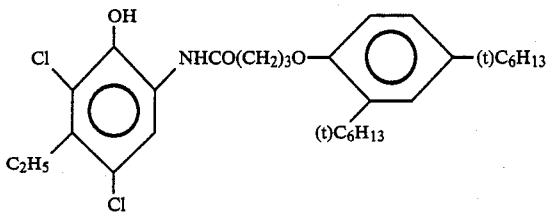
(C-8)
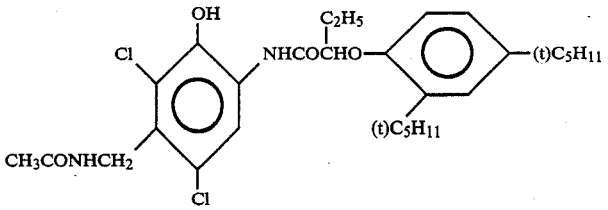
(C-9)
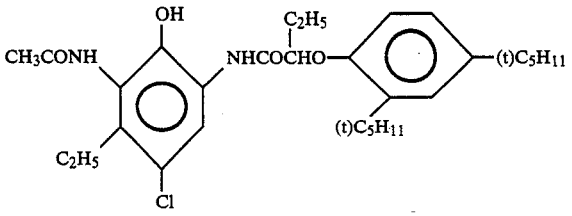
(C-10)
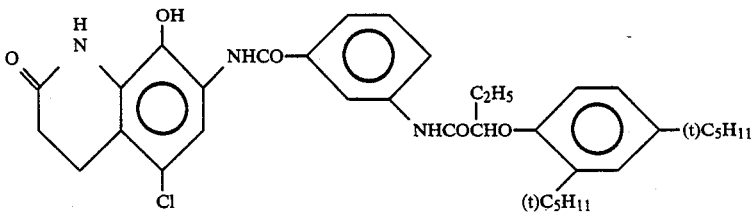
(C-11)
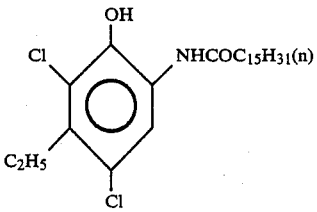

-continued
(C-12)
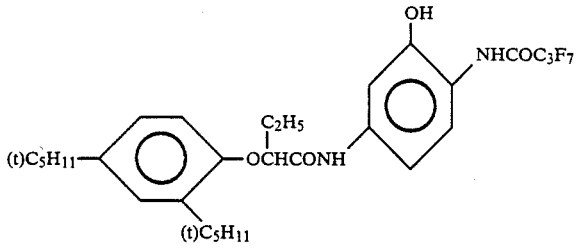
(C-13)
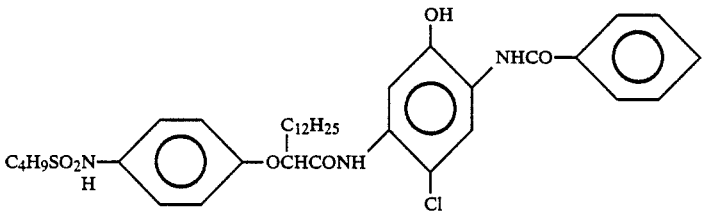
(C-14)
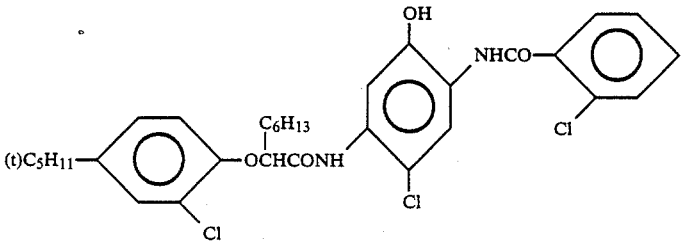
(C-15)
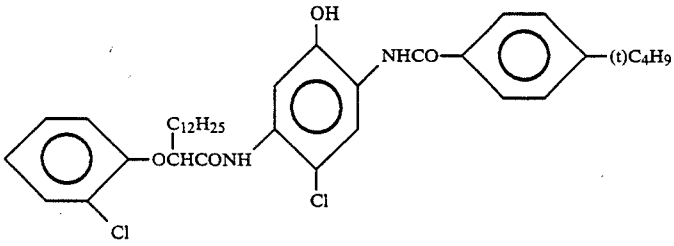
(C-16)
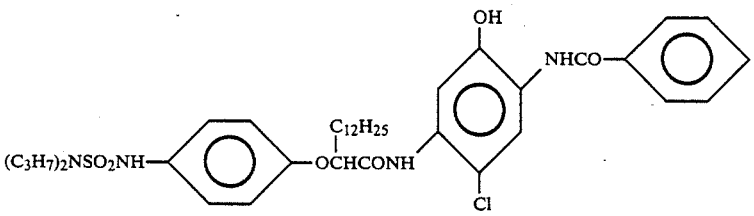
(C-17)
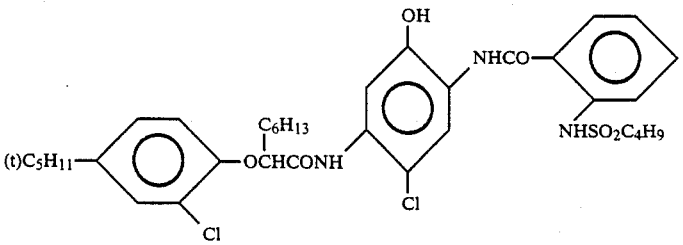

-continued
(C-18)
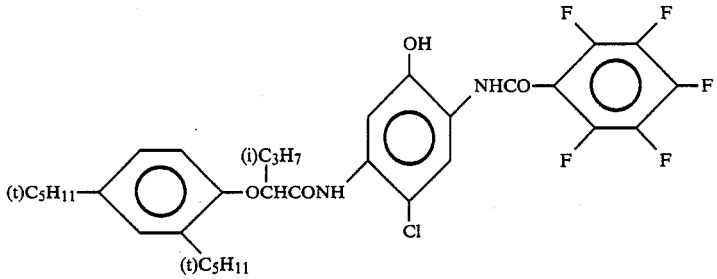
(C-19)
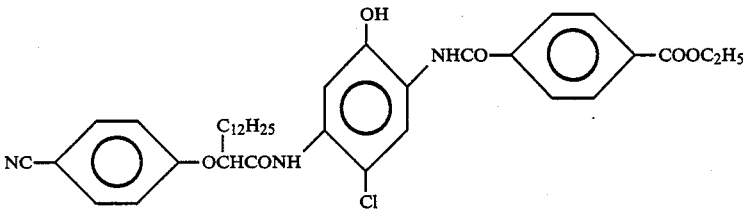
(C-20)
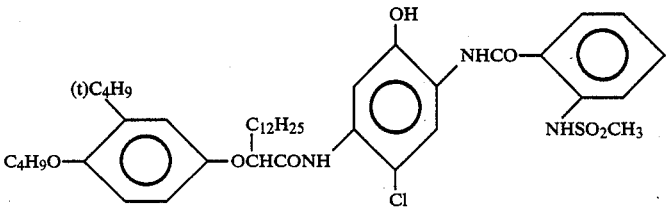
(C-21)
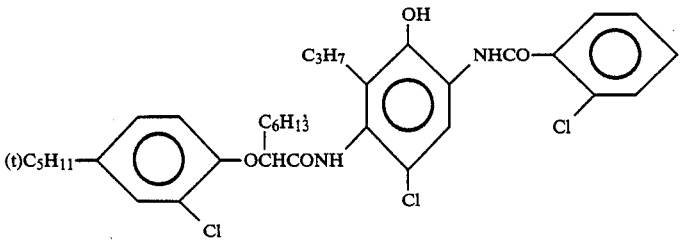
(C-22)
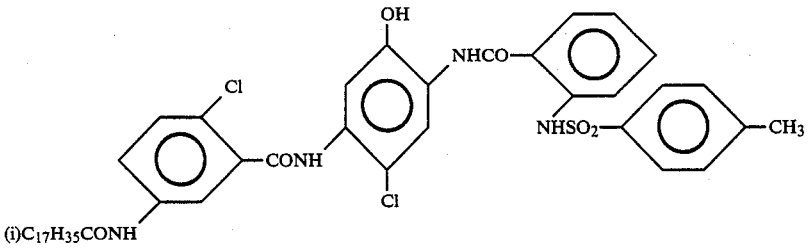
(C-23)
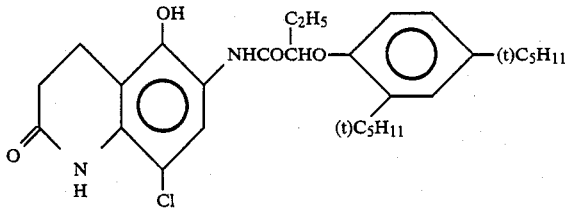

-continued
(C-24)
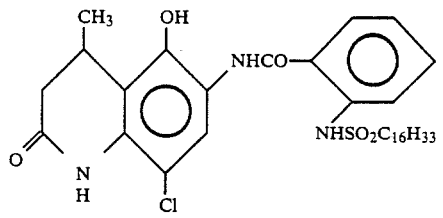
(C-25)
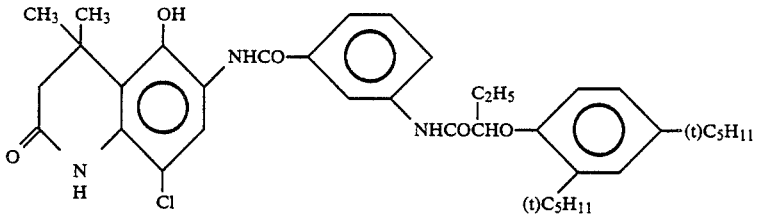
(C-26)
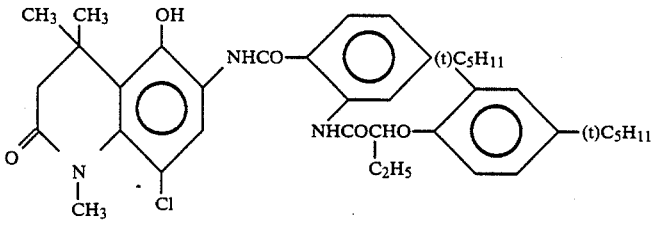
(C-27)
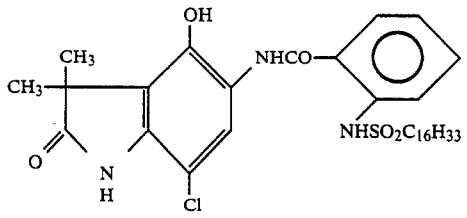
(C-28)
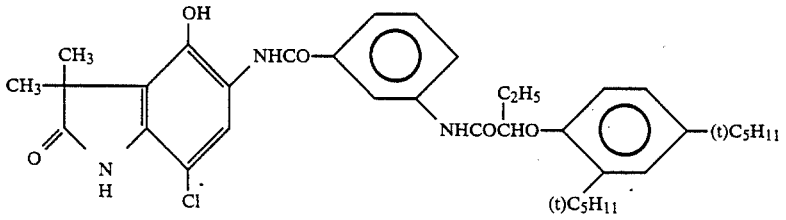
(C-29)
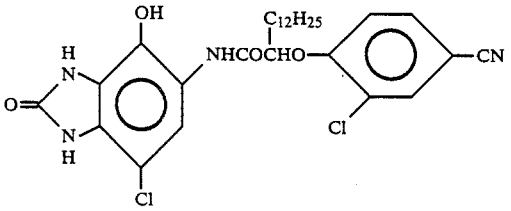
(C-30)
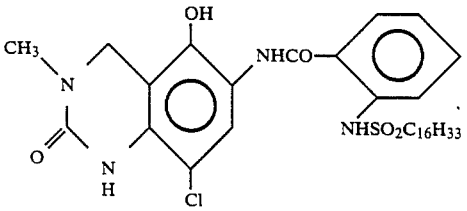

-continued
(C-31)
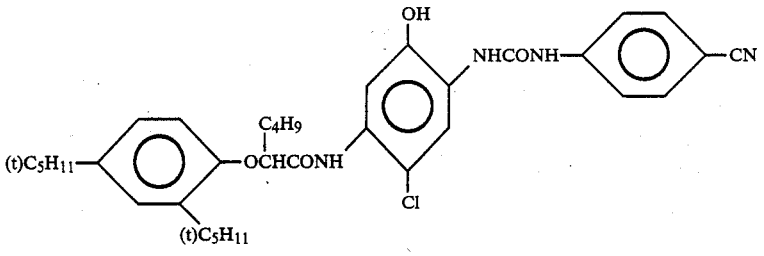
(C-32)
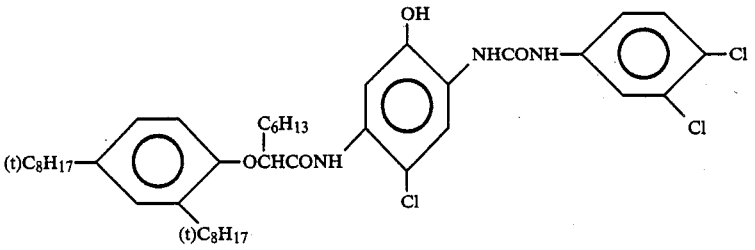
(C-33)
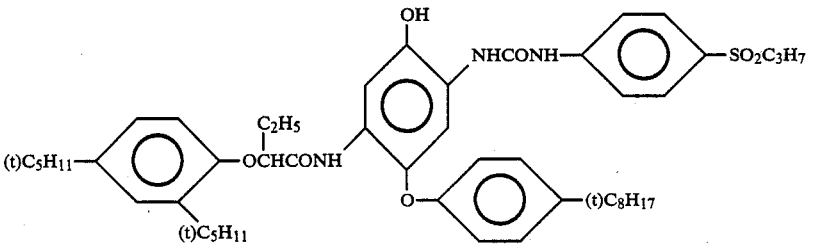
(C-34)
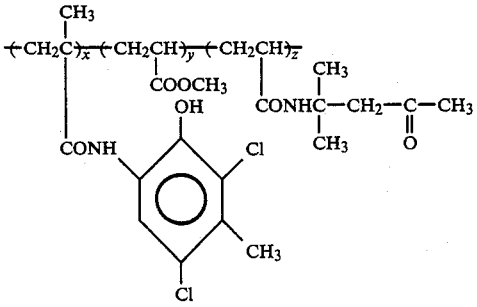
x/y/z = 50/20/30
(C-35)
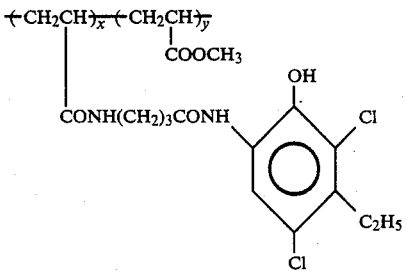
x/y = 55/45

-continued
(C-36)
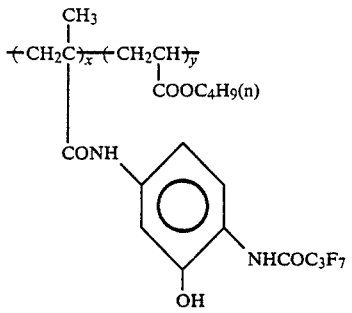
x/y = 60/40
(C-37)
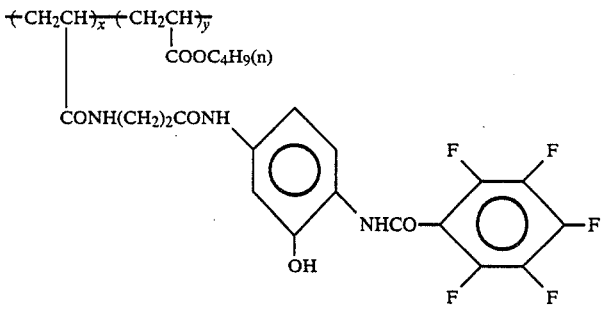
x/y = 50/50
(C-38)
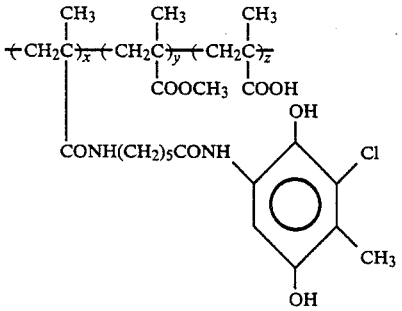
x/y/z = 55/40/5
(C-39)
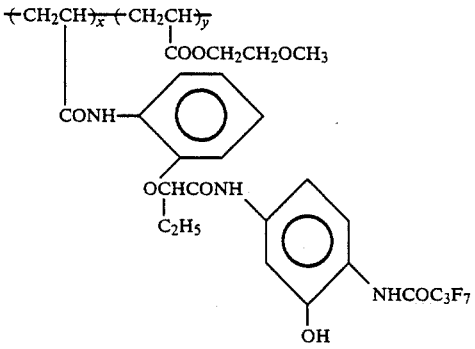
x/y = 60/40

-continued
(C-40)
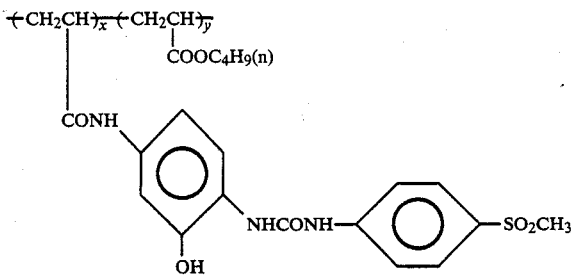
x/y = 50/50
(C-41)
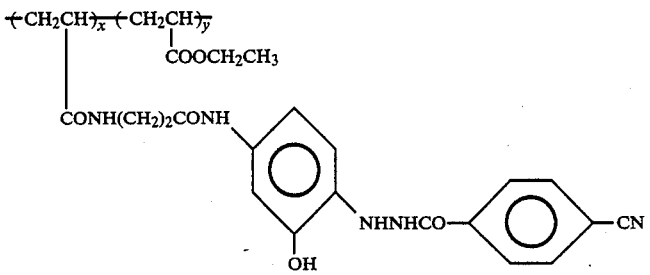
x/y = 45/55
(C-42)
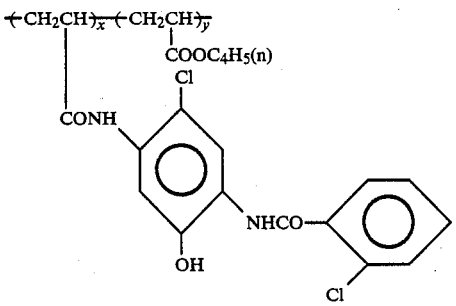
x/y = 50/50
(C-43)
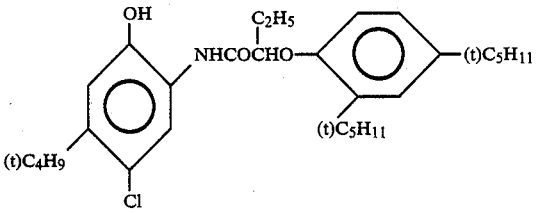
(C-44)
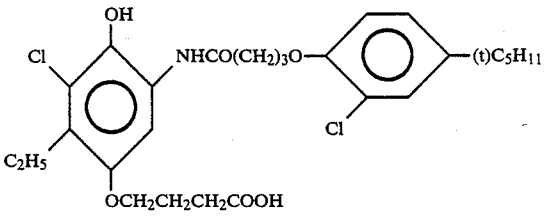

-continued
(C-45)
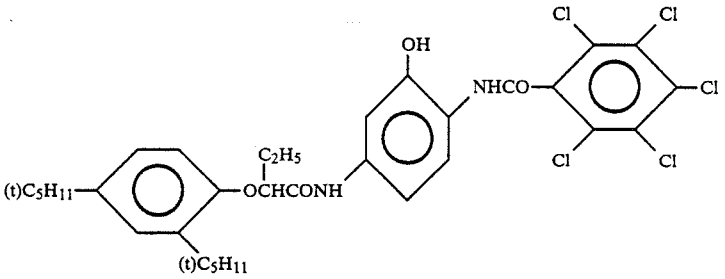
(C-46)
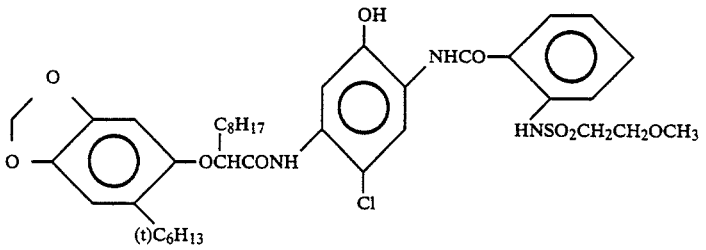
(C-47)
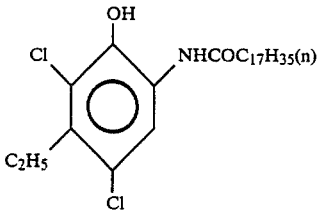
(C-48)
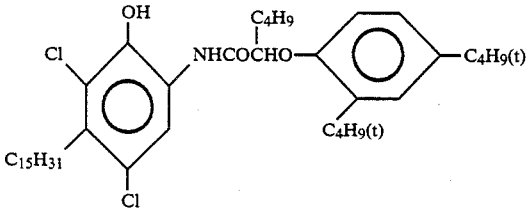
(C-49)
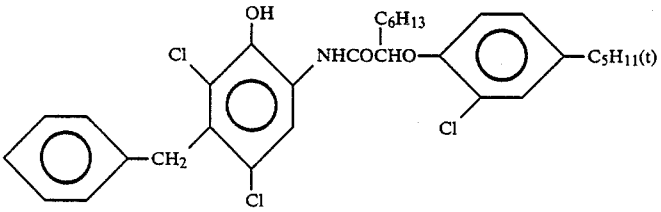
(C-50)
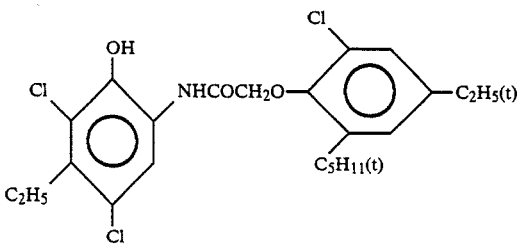
(C-51)
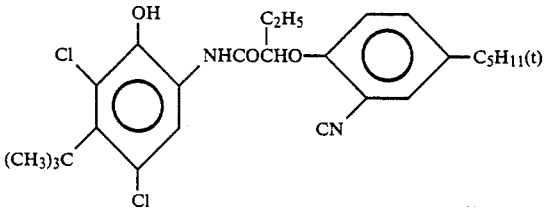

-continued
(C-52)
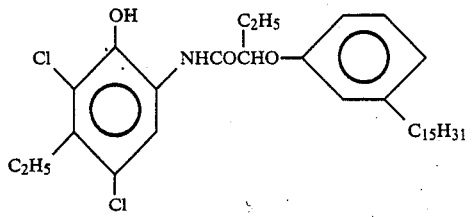
(C-53)
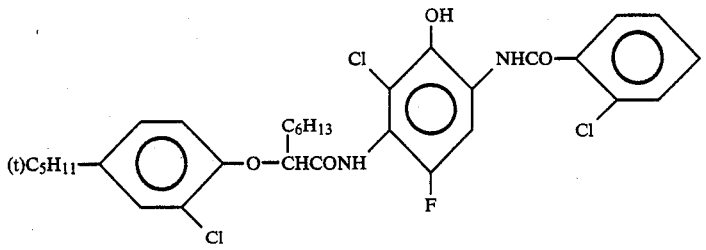
(M-1)
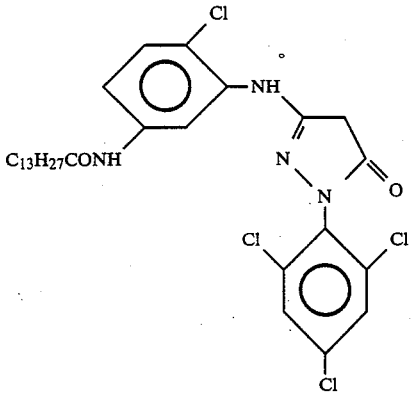
(M-2)
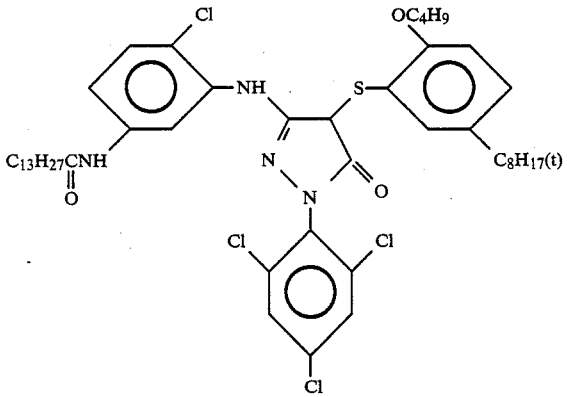
60
65

-continued
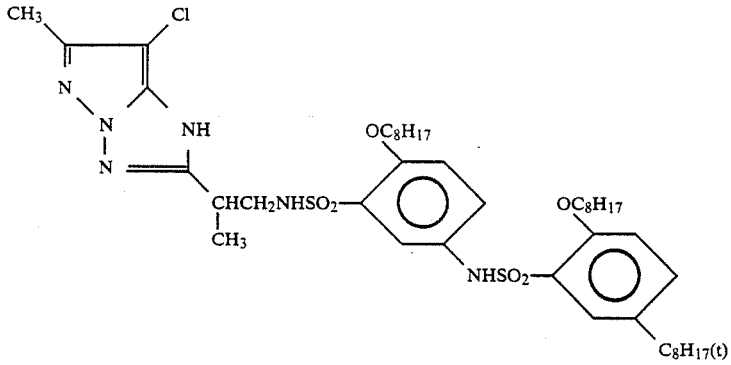
(M-3)
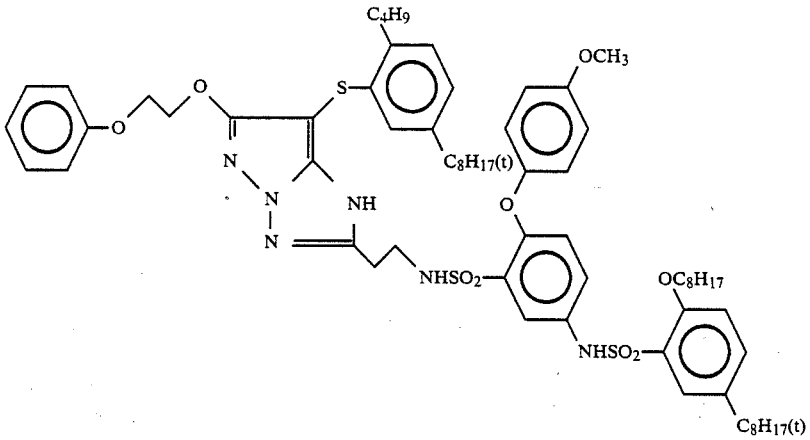
(M-4)
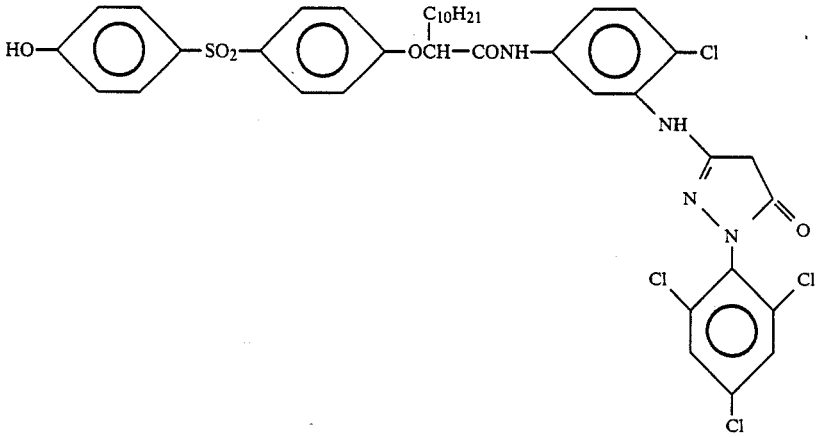
(M-5)
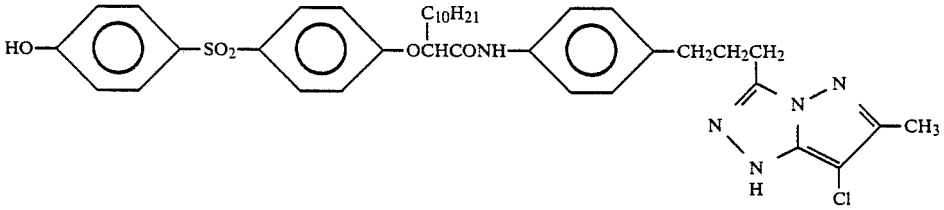
(M-6)

-continued
(M-7)
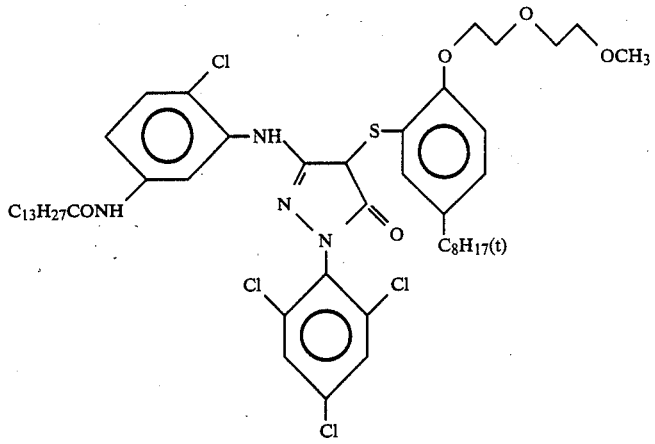
(M-8)
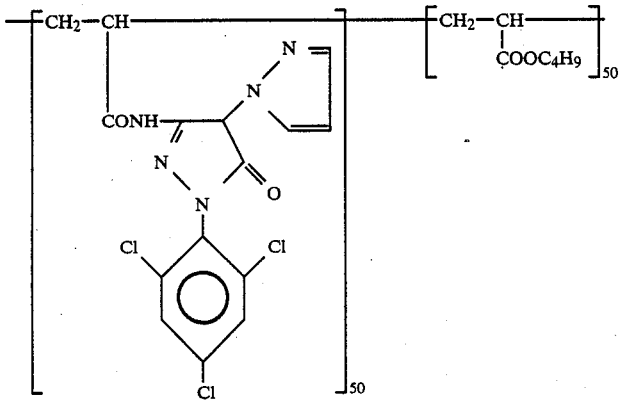
(M-9)
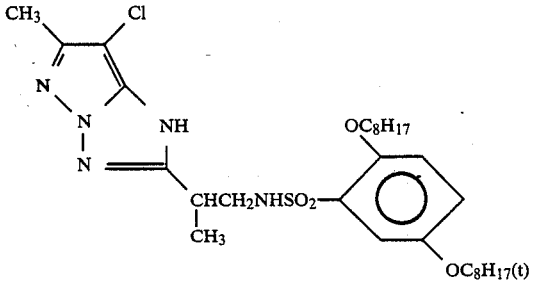
(M-10)
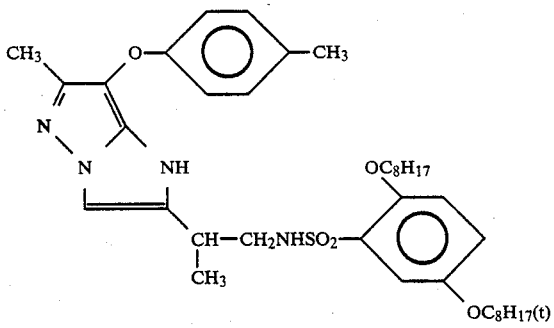

-continued
(M-11)
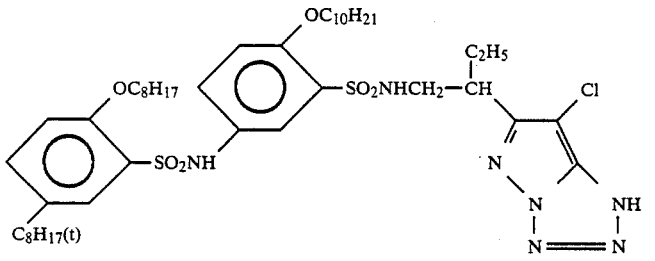
(M-12)
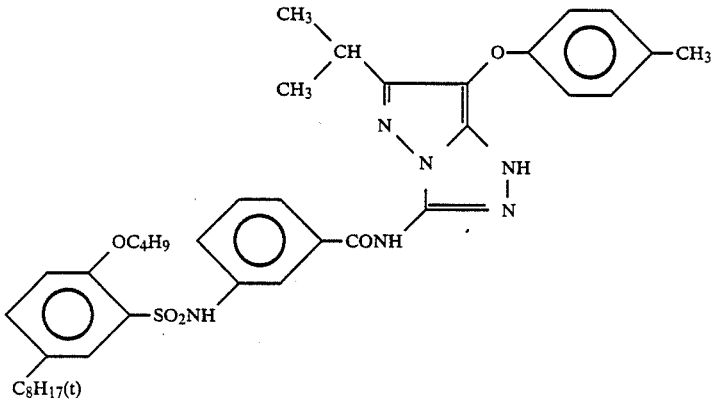
(M-13)
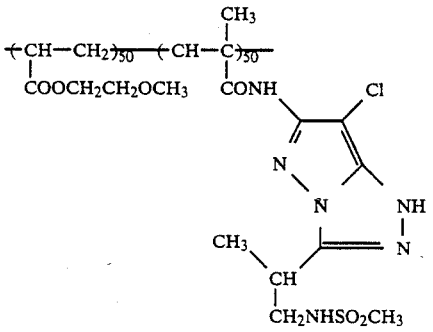
(M-14)
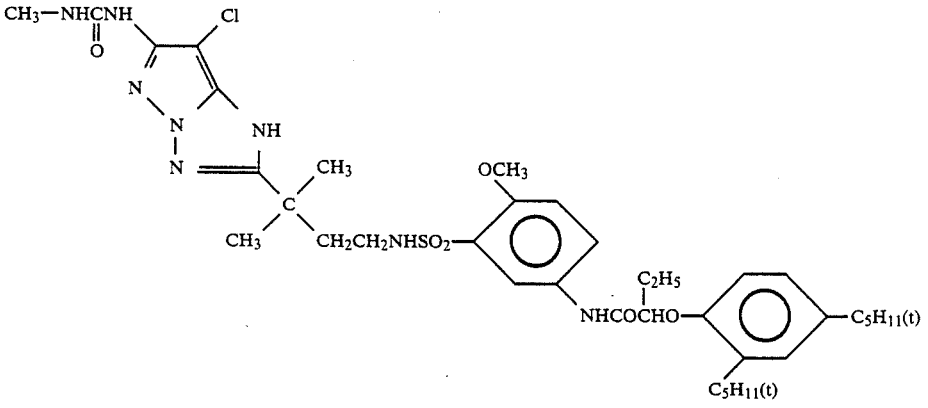

-continued
(M-15)
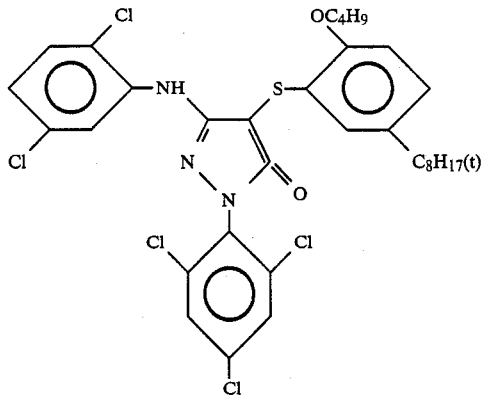
(M-16)
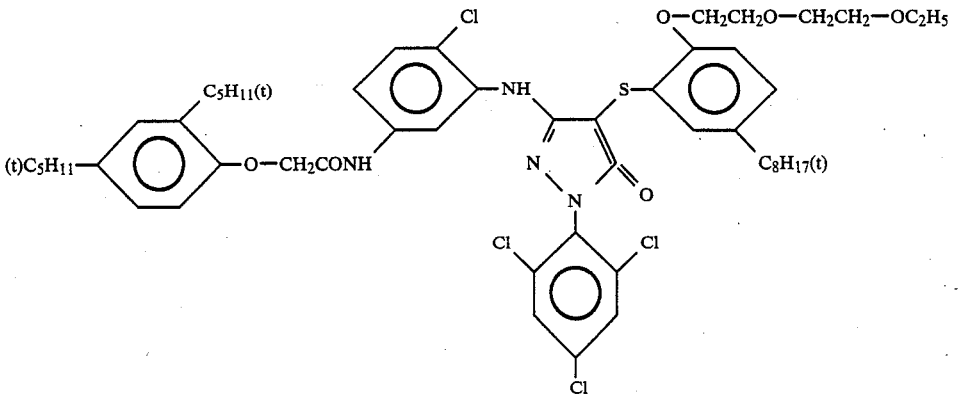
(M-17)
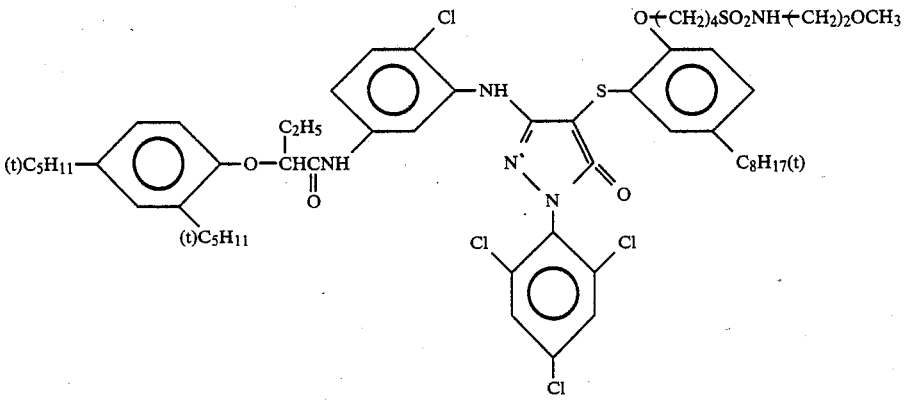
(M-18)
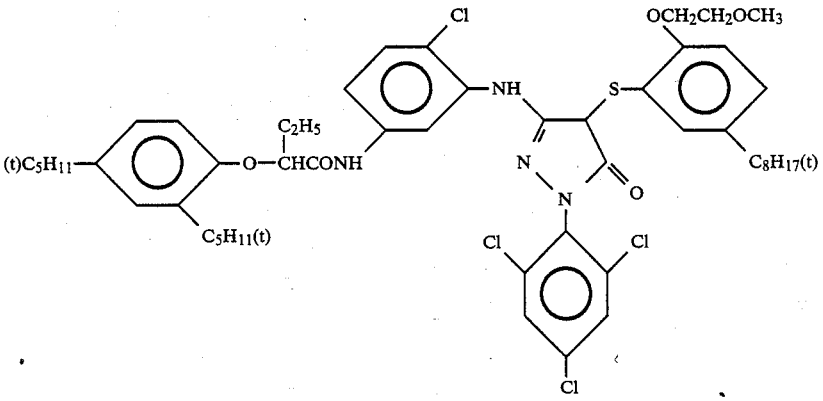

-continued
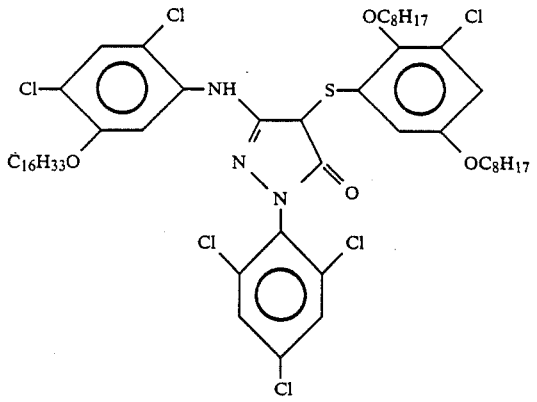
(M-19)
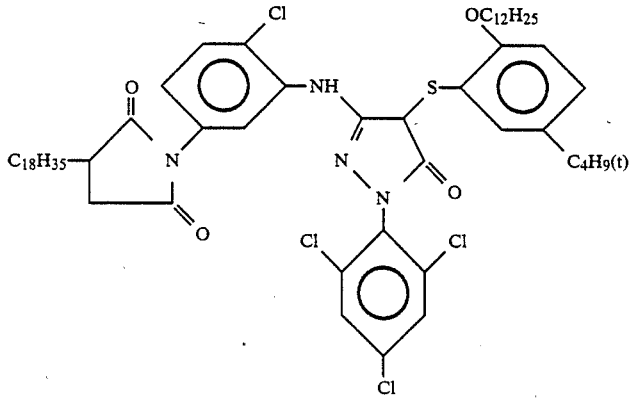
(M-20)
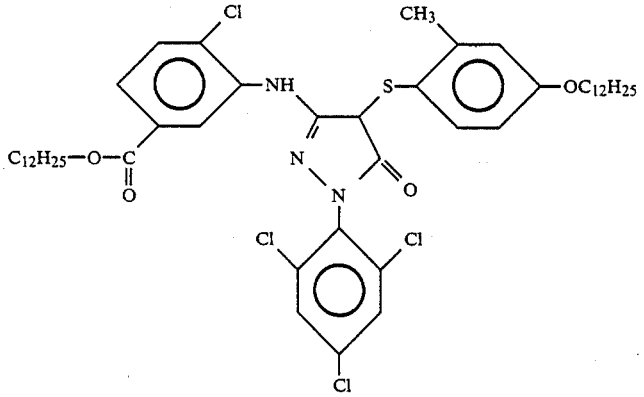
(M-21)
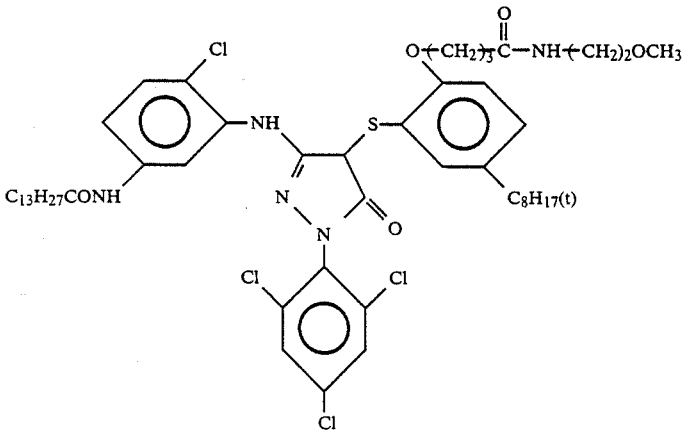
(M-22)

-continued
(M-23)
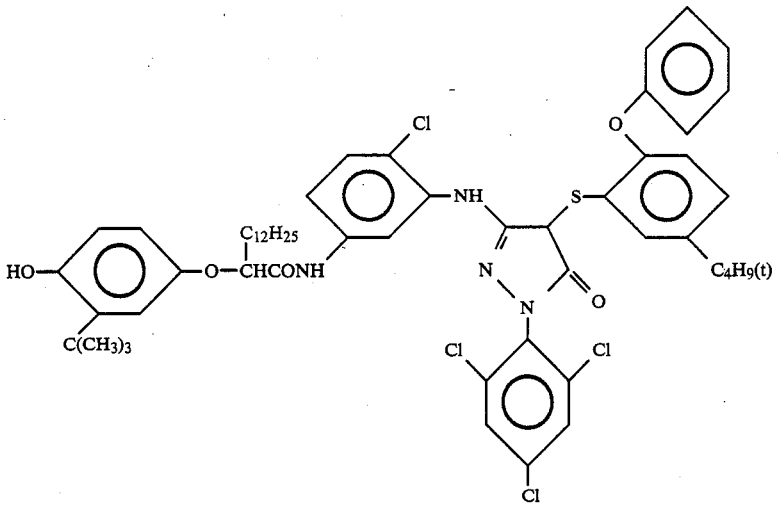
(M-24)
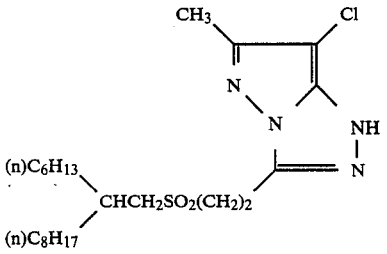
(M-25)
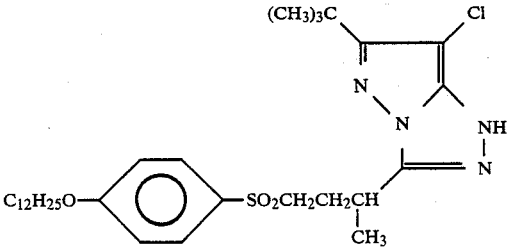
(M-26)
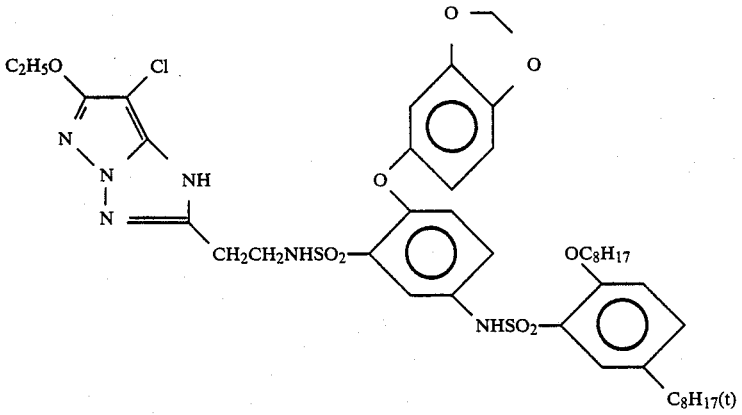

-continued
(M-27)
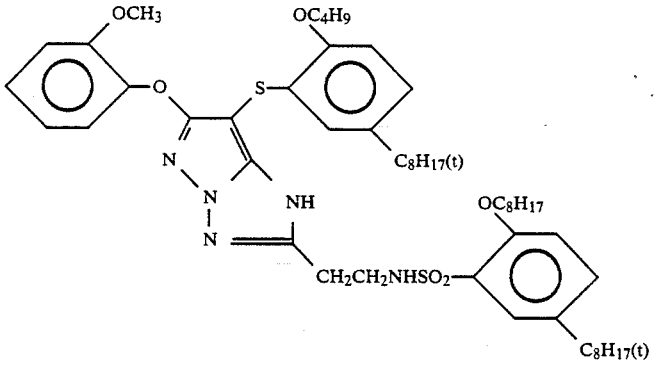
(M-28)
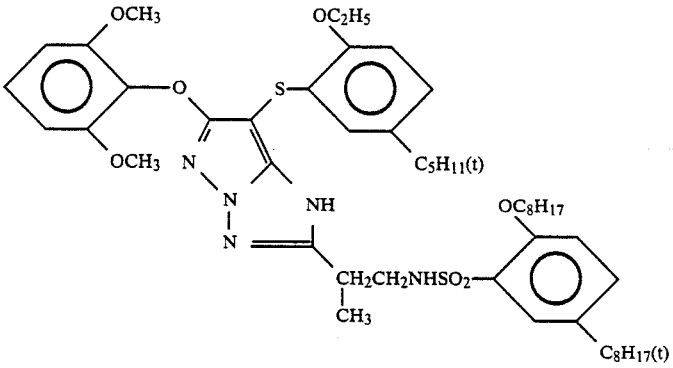
(M-29)
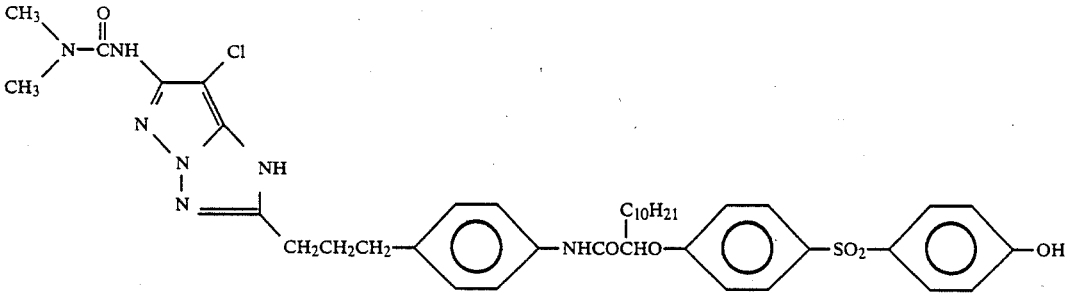
(M-30)
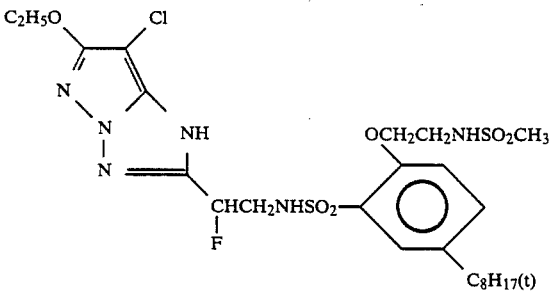
(M-31)
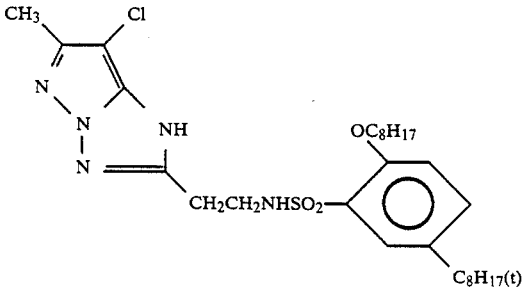

-continued
(M-32)
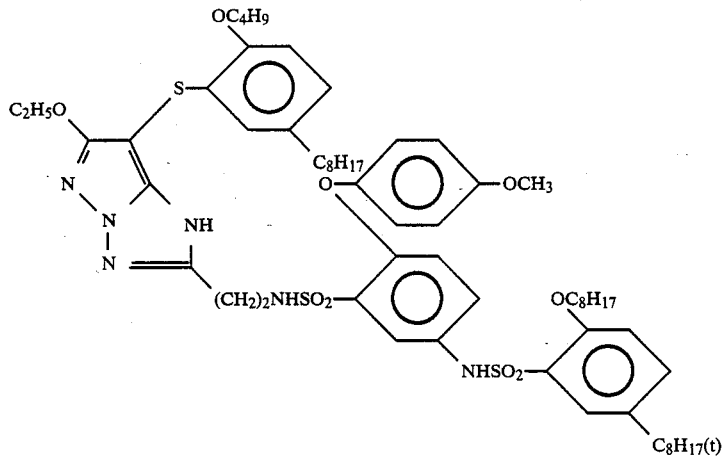
(M-33)
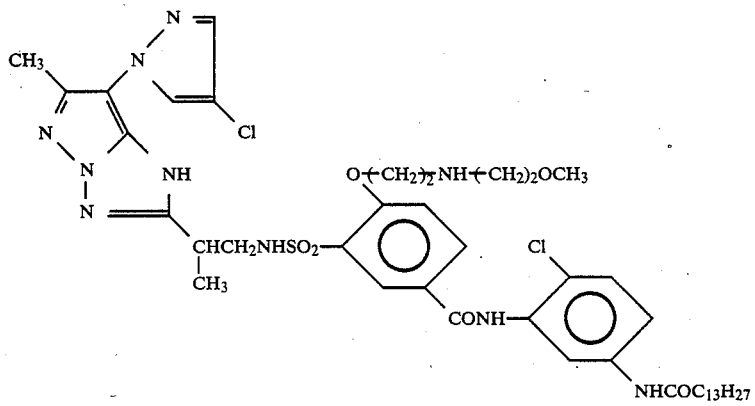
(M-34)
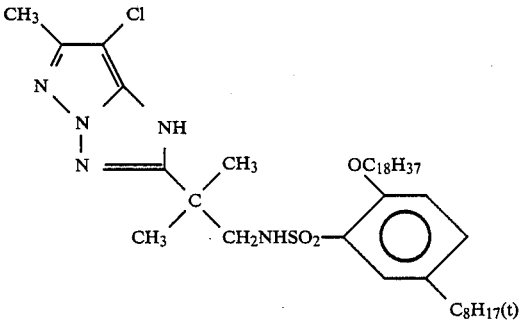
(M-35)
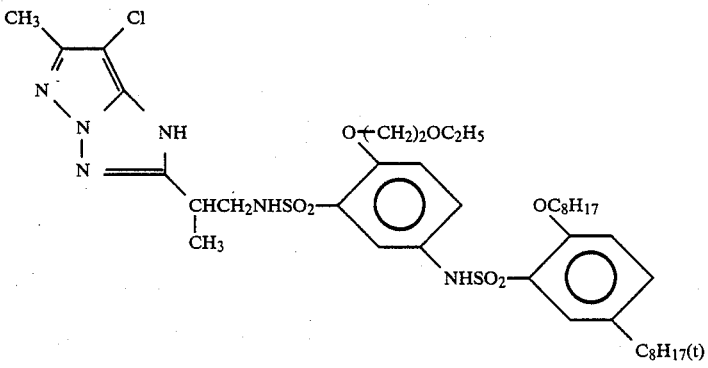

-continued
(M-36)
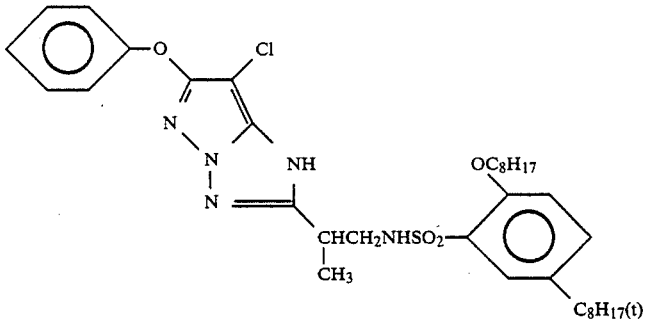
(M-37)
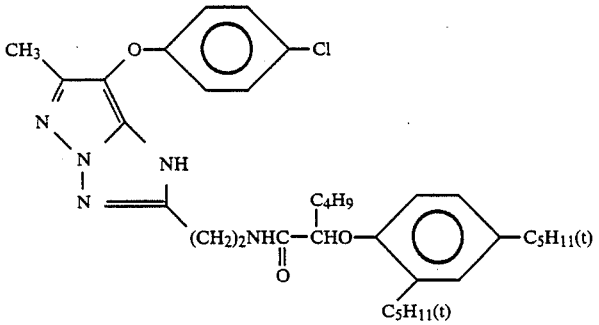
(M-38)
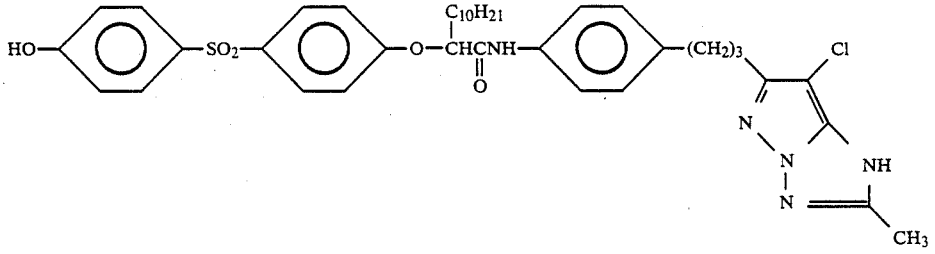
(M-39)
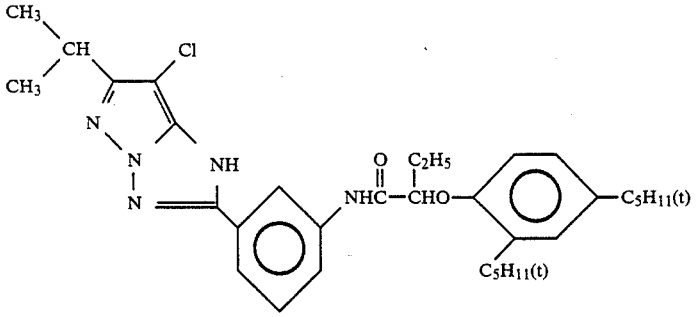
(M-40)
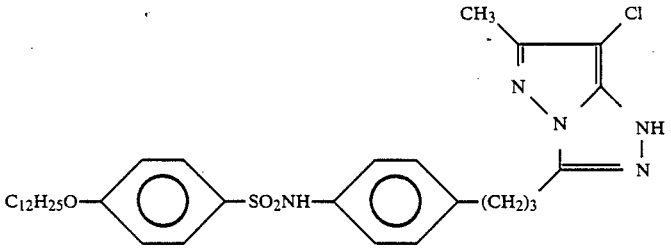

-continued
(M-41)
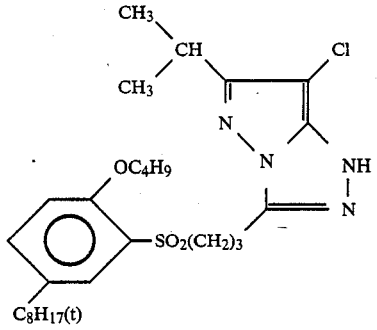
(M-42)
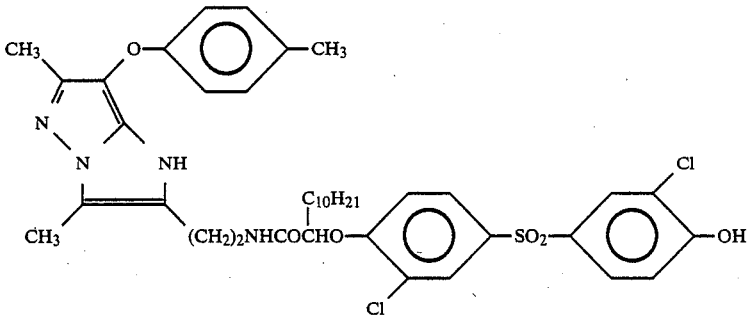
(M-43)
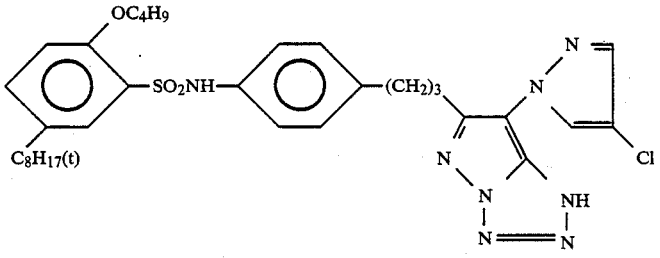
(M-44)
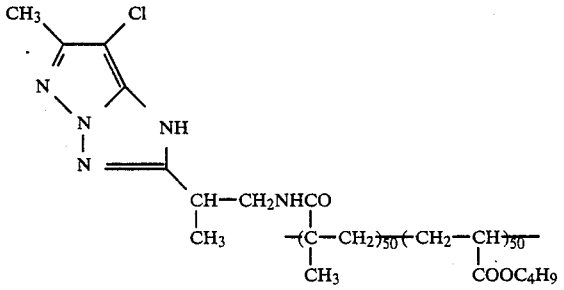
(Y-1)
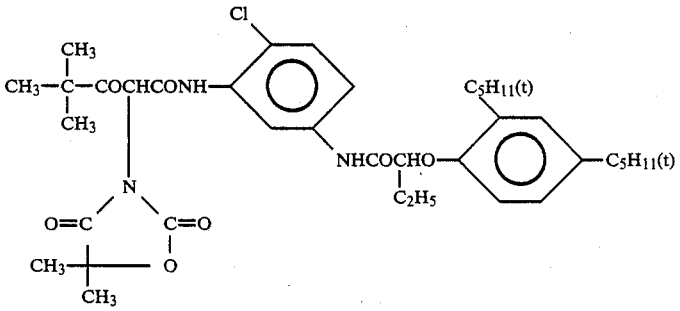

-continued
(Y-2)
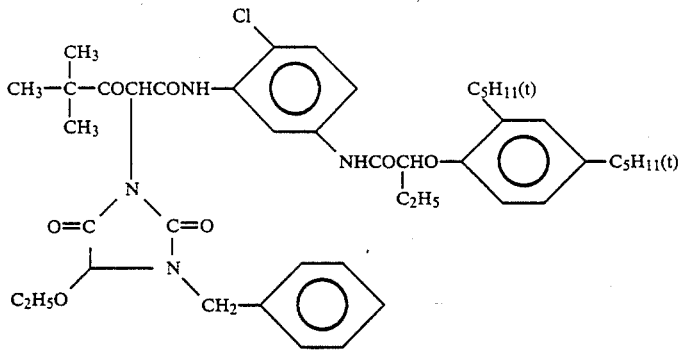
(Y-3)
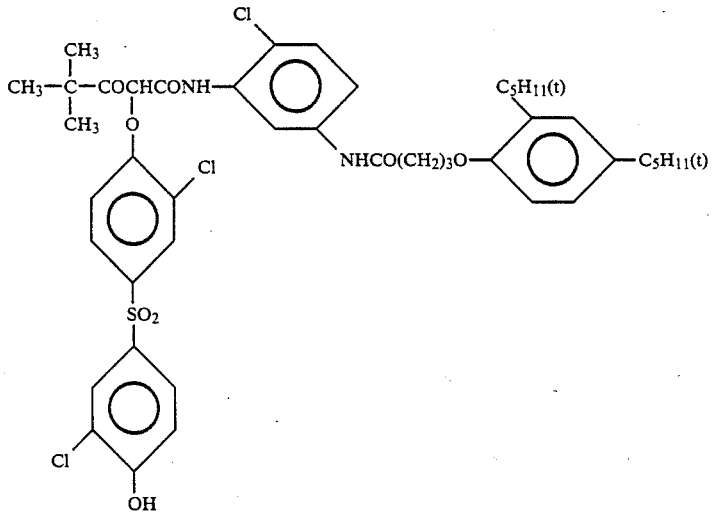
(Y-4)
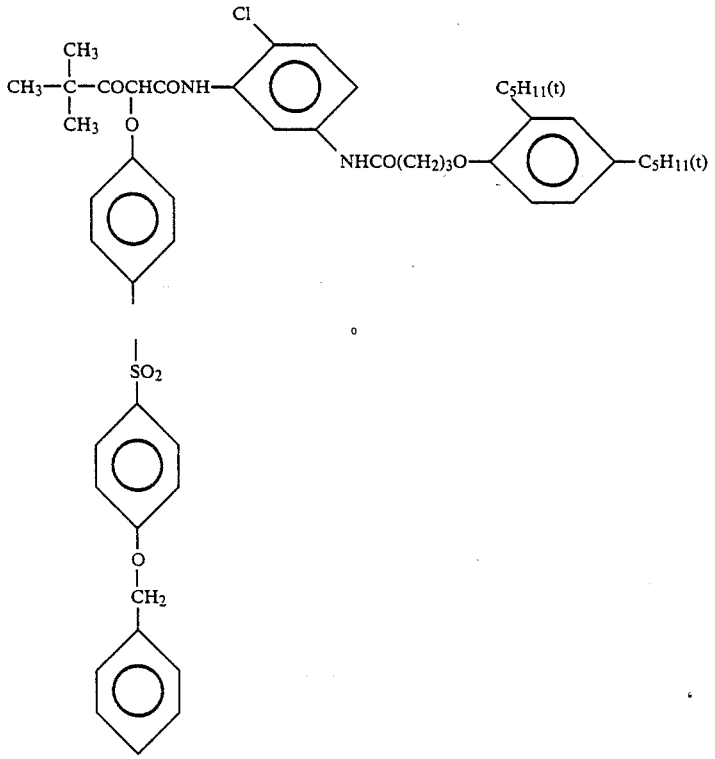

-continued
(Y-5)
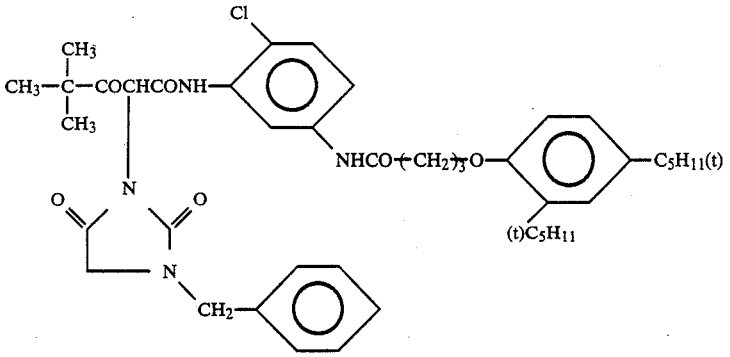
(Y-6)
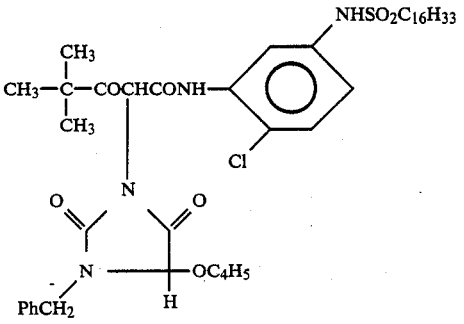
(Y-7)
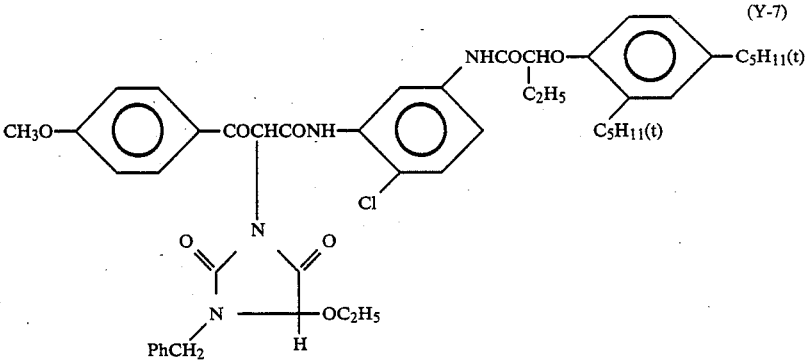
(Y-8)
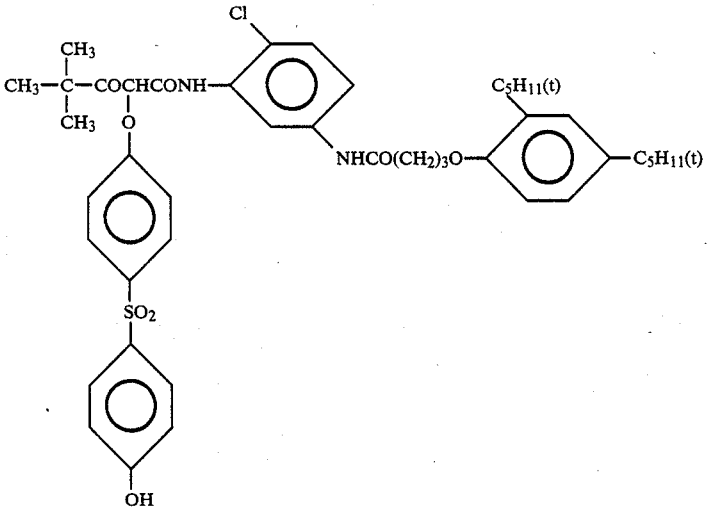

-continued
(Y-9)
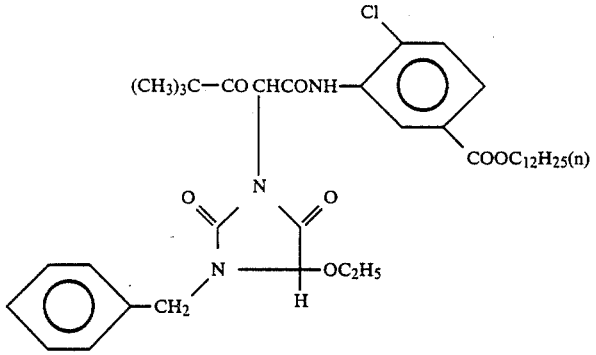
(Y-10)
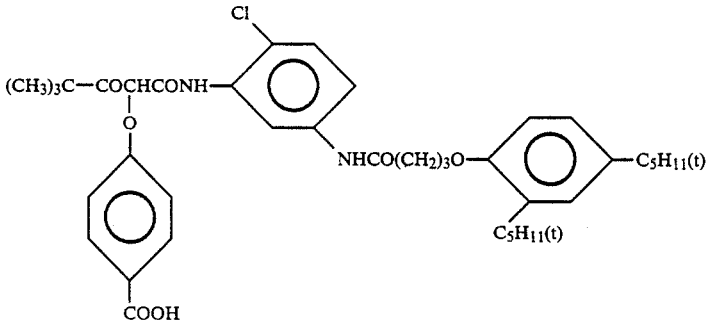
(Y-11)
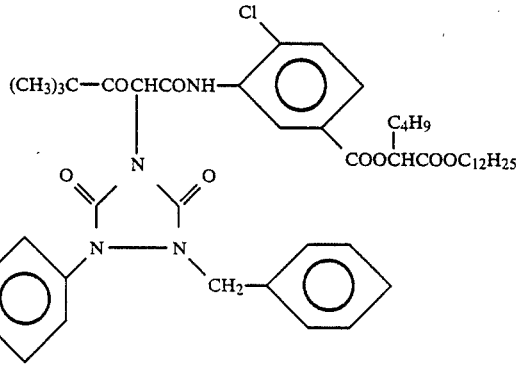
(Y-12)
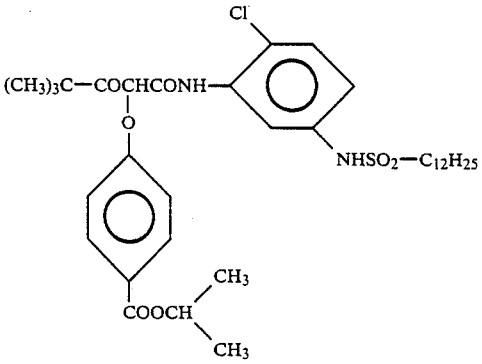

-continued
(Y-13)
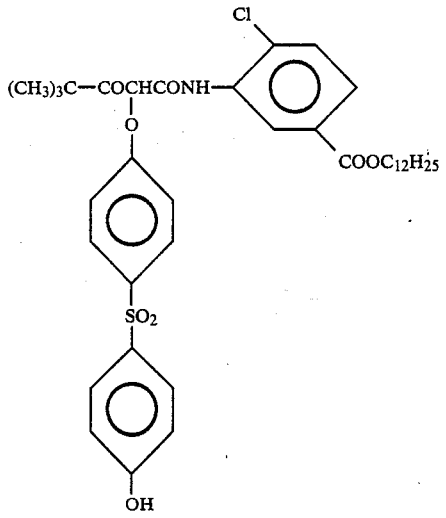
(Y-14)
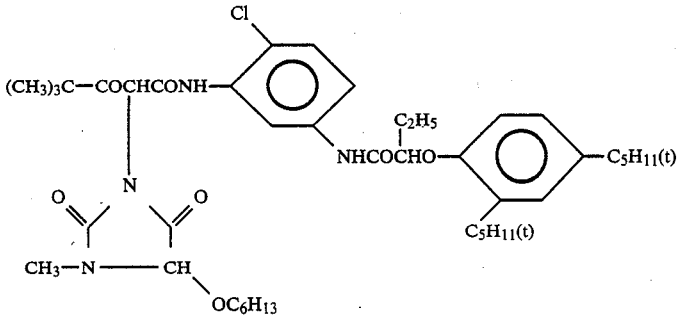
(Y-15)
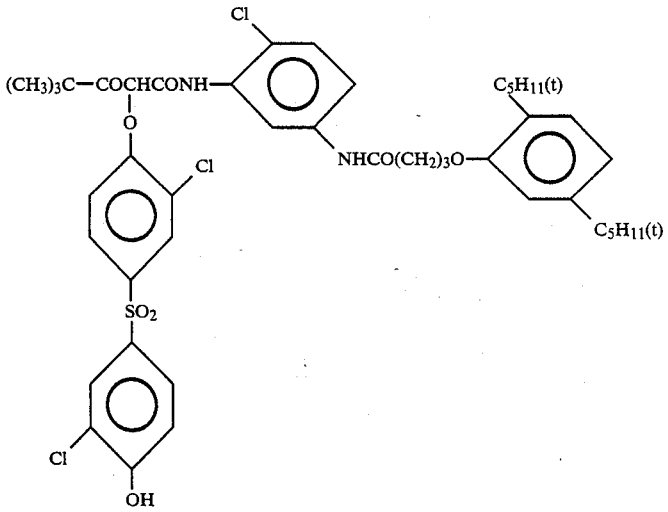
(Y-16)
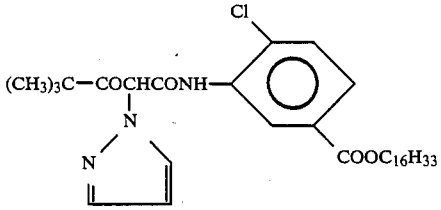

-continued (Y-17)

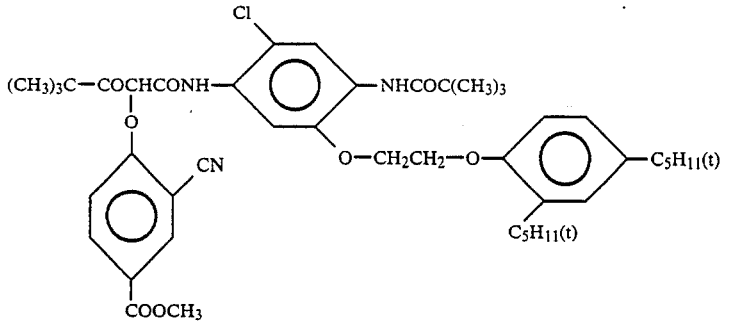

(Y-18)

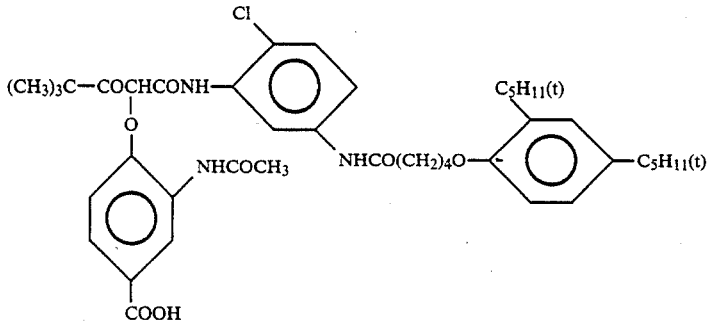

(Y-19)

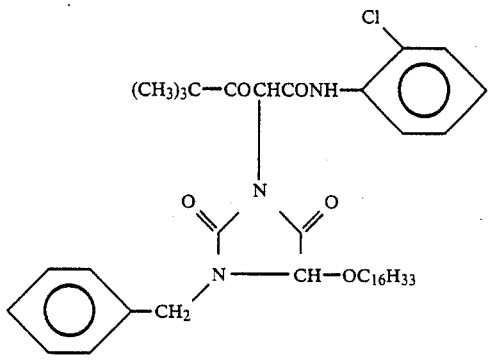

(Y-20)

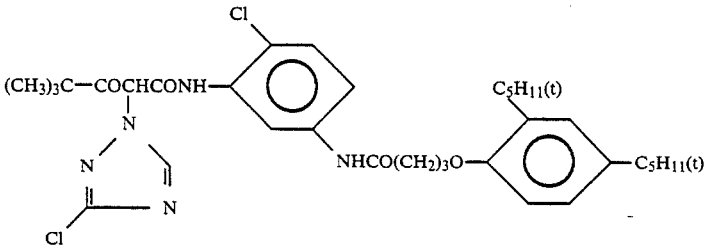

The compounds represented by formulae (I) and (II) of the present invention are dissolved in high boiling point coupler solvents being immiscible with water and then can be dispersed in hydrophilic colloids as lipophilic fine grains (oil droplets). Auxiliary solvents may be used, if desired, when dissolved.

In order to improve the fastness of color images, water-insoluble and organic solvent-soluble polymer compounds may be present in the lipophilic fine grains.

As the other means of dispersing as lipophilic fine grains, the compounds of formulae (I) and (II) can also be impregnated in polymer latex grains.

As the high boiling point coupler solvents, there can be used compounds which have a melting point of 100° C. or less and a boiling point of 140° C. or more, being immiscible with water and acting as good solvents for the couplers. The melting point of the high boiling point coupler solvents is preferably 80° C. or less. The boiling point of the high boiling point coupler solvents is preferably 160° C. or more, more preferably 170° C. or more.

When the melting point of a coupler solvent is over about 100° C., the crystallization of the coupler often occurs to decrease the effect of improvement of color reproducibility.

When the boiling point of a coupler solvent is less than about 140° C., the solvent easily evaporates when the photographic emulsion is applied and dried, and so is difficult to be present as oil droplets in the photographic emulsion with the compounds of the present invention. As a result, the effect of the present invention cannot be sufficiently obtained.

The specific examples of high boiling point coupler solvents include, for example, phthalic acid alkyl esters (e.g., dibutyl phthalate, dioctyl phthalate, diisodecyl phthalate, dimethoxyethyl phthalate), phosphates (e.g., diphenyl phosphate, triphenyl phosphate, tricresyl phosphate, trioctyl phosphate, trinonyl phosphate, dioctyl butyl phosphate, monophenyl-p-t-butyl phenyl phosphate), citrates (e.g., tributyl acetyl citrate), benzoates (e.g., octyl benzoate), alkylamides (e.g., dietnyl lauryl amide, dibutyl lauryl amide), fatty acid esters (e.g., dibutoxy ethyl succinate, diethylazelate), trimesic acid esters (e.g., trimesic acid tributyl), phenols

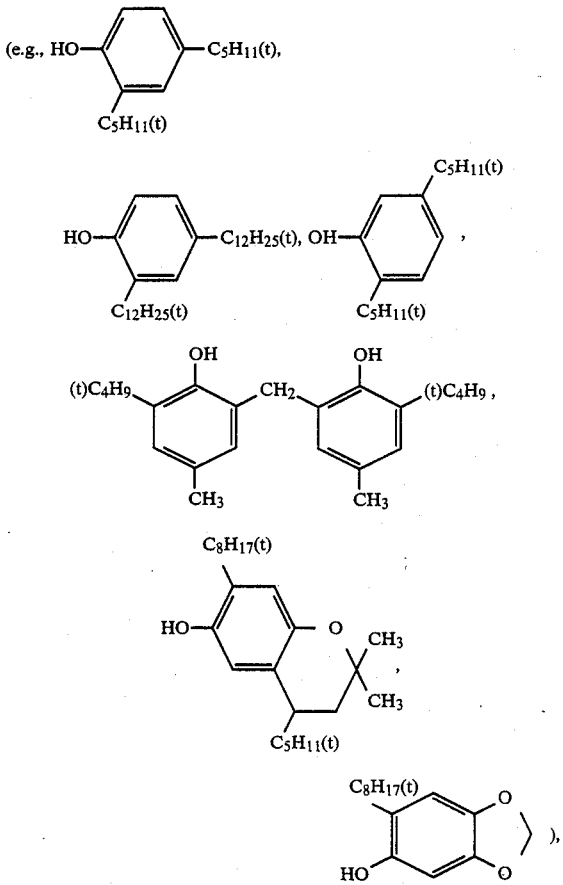

and ethers (e.g., phenoxyethanol, diethylene glycol monophenylether).

The specific example of auxiliary solvents are organic solvents having low boiling points of about 30 to 140° C. under atmospheric pressure, for example, lower alkyl acetate such as ethyl acetate, isopropyl acetate and butyl acetate; ethyl propionate, methanol, ethanol, secondary butyl alcohol, cyclohexanol, fluorinated alcohol, methyl isobutyl ketone, β-ethoxyethylacetate, methyl cellosolve acetate acetone, methyl acetone, acetonitrile, dioxane, dimethylformamide, dimethylsulfoxide, chloroform, cyclohexane and so on.

The dispersion method by polymer latex is, for example, the low double polymer latex dispersing method described in U.S. Pat. No. 4,203,716.

In the photosensitive materials of the present invention, the hydrophilic colloidal layer preferably contains ultraviolet ray absorbing agents, such as benzotriazole compounds substituted with aryl group (e.g., disclosed in U.S. Pat. No. 3,533,794), 4-thiazolidone compounds (e.g., disclosed in U.S. Pat. Nos. 3,314,794 and 3,352,681), benzophenone compounds (e.g., disclosed in JP-A No. 46-2784), cinnamic acid ester compounds (e.g., disclosed in U.S. Pat. Nos. 3,705,805 and 3,707,357), butadiene compounds (e.g., disclosed in U.S. Pat. No. 4,045,229) and bisphenol derivatives (e.g., disclosed in U.S. Pat. No. 3,700,455). There may be used ultraviolet ray absorbing couplers (e.g., α-naphthol series cyan dye forming couplers) and ultraviolet ray absorbing polymers. These ultraviolet ray absorbing agents may be mordanted in a specific layer.

The preferable ultraviolet ray absorbing agents are represented by the general formulae (U-I) and (U-II):

Formula (U-I)

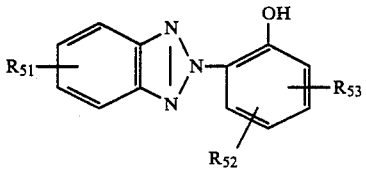

wherein each of $R_{51}$, $R_{52}$, and $R_{53}$ represents a hydrogen atom, a halogen atom, a nitro group, a hydroxyl group, a substituted or unsubstituted alkyl group, an alkoxyl group, an aryl group, an aryloxy group or an acylamino group;

Formula (U-II)

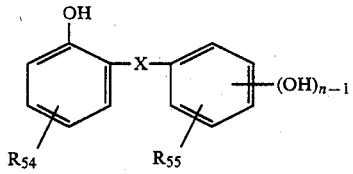

wherein each of $R_{54}$ and $R_{55}$ represents a hydrogen atom, a substituted or unsubstituted alkyl group, an alkoxy group or an acyl group; X is —CO— or —COO—; and n is an integer of 1 to 4.

The following are the examples of the compounds.

(U-I)

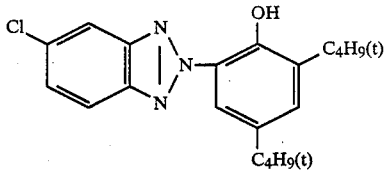

(U-2)

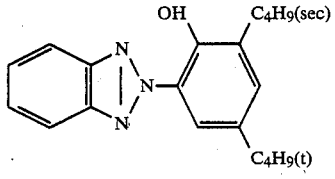

(U-3)

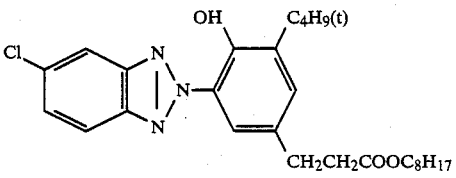

-continued

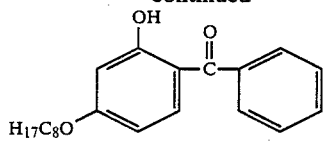

(U-4)

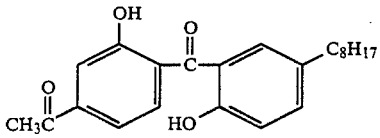

(U-5)

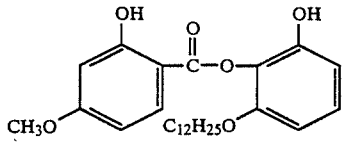

(U-6)

The silver halides used in the silver halide emulsions of the present invention include any silver halides used in ordinary silver halide emulsions such as silver chloride, silver iodobromide, silver bromide, silver chlorobromide and silver chloroiodobromide. These silver halide grains may be coarse or fine in any arbitrary wide or narrow range of grain size but it is desirable that a monodispersed emulsion can be used preferably in a variable rate of 15% or less, more preferably 10% or less.

Also, these silver halide grains may be in the form of regular crystals or irregular crystals such as spherical, tabular and twin crystals and also in any ratio of [100] and [111] crystal faces. Moreover, the crystalline structures of these silver halide grains may be uniform in the inside and in the outside or in the state of layers having different qualities in the inside and in the outside. Further, these silver halides may be the type of forming latent images mainly on the surface or the other type of forming internal latent images mainly inside the grains. The type of forming internal latent images inside grains is particularly advantageously used to form direct positive images. Furthermore, these silver halides may be produced by any of a neutral method, an ammonia method and an acid method and also by any of a single jet method, a double jet method, a reverse mixing method and a conversion method.

A mixture of two or more kinds of silver halide emulsions prepared independently can be used.

Silver halide photographic emulsions prepared by dispersing silver halide grains in binder liquids can be sensitized by chemical sensitizers. The chemical sensitizers advantageously used together in the present invention include noble metal sensitizers, sulfur sensitizers, selenium sensitizers and reduction sensitizers.

The noble metal sensitizers include gold compounds, ruthenium compounds, rhodium compounds, palladium compounds, iridium compounds and platinum compounds.

When gold compounds are used, ammonium thiocyanate and sodium thiocyanate can also be used together.

The sulfur sensitizers include active gelatin and sulfur compounds.

The selenium sensitizers include active or inert selenium compounds.

The reduction sensitizers include monovalent tin salts, polyamines, bisalkylaminosulfides, silane compounds, iminoaminomethane sulfinic acid, hydrazinium salts, and hydrazine derivatives.

The photosensitive materials of the present invention preferably may have the other auxiliary layers than the silver halide emulsion layers such as a protective layer, an intermediate layer, a filter layer, an antihalation layer and a back layer.

As the binders or protective colloids used in the emulsion layers and the intermediate layers of the photosensitive materials of the present invention, gelatin is advantageous and also the other hydrophilic colloids are employable.

For example, there can be used proteins such as gelatin derivatives, graft polymers of gelatin and other polymers, albumin, and casein; cellulose derivatives such as hydroxyethylcellulose, carboxymethylcellulose, and cellulose sulfates; sugar derivatives such as sodium alginate and starch derivatives; and various synthetic hydrophilic high molecular weight substances such as homopolymers or copolymers of polyvinyl alcohols, polyvinyl alcohol partial acetal, poly-Nvinylpyrolidone, polyacrylic acid, polymethacrylic acid, polyacrylamide, polyvinylimidazole, polyvinylpyrazole, and the like.

As gelatin, there can be used lime-treated gelatin, and enzyme-treated gelatin described in *Bull. Soc. Sci. Phot. Japan,* No. 16, page 30 (1966). Furthermore, hydrolysis decomposition product or enzyme decomposition product of gelatin can be used.

The emulsion layers and the auxiliary layers of the photosensitive materials of the present invention can contain other various additives for photography, for example, antifoggants, dye image discoloration-preventing agents, color stain preventing agents, brightening agents, antistatic agents, hardening agents, surface active agents, plasticizers, wetting agents and ultraviolet ray absorbing agents, as disclosed in *Research Disclosure,* Vol. 176, No. 17643.

The silver halide photosensitive materials of the present invention are produced by applying the emulsion and auxiliary layers containing said various photographic additives, if desired, onto supports treated with corona discharge, flame or ultraviolet radiation directly or through an undercoating or intermediate layer.

The supports used in the present invention include, for example, baryta paper, polyethylene-coated paper, polypropylene synthetic paper, and transparent supports having a reflecting layer or using a reflector such as glass plates, polyester films such as cellulose acetate, cellulose nitrate or polyethylene terephthalate, polyamide films, polycarbonate films, polystyrene films and vinyl chloride resins. These supports are properly selected according to the use objects of the photosensitive materials.

The emulsion layers and the other layers used in the present invention are coated by various coating methods such as dipping coating, air doctor coating, curtain coating, and hopper coating. Moreover, two or more layers can be coated at the same time by the methods described in U.S. Pat. Nos. 2,761,791 and 2,941,898.

The emulsion layers of the present invention can be arbitrarily coated, for example, in an order of a blue-sensitive emulsion layer, a green-sensitive emulsion layer and a red-sensitive emulsion layer or another order of a red-sensitive emulsion layer, a green-sensitive emulsion layer, and a blue-sensitive emulsion layer successively arranged from the support side.

Moreover, an ultraviolet ray absorbing layer is prepared next to the layer being farthest apart from the support to be faced to the support side and, if desired, also on the reverse side of the support. Particularly in the latter case, it is desirable that a protective layer consisting of substantially only gelatin is formed on the most upper layer.

The color developing solution used for the development of the photosensitive materials of the present invention is preferably an alkaline aqueous solution consisting principally of an aromatic primary amine series color developing agent. As the color developing agents, aminophenol series compounds are also useful, but p-phenylenediamine series compounds are preferably used. As the typical examples of p-phenylene diamine series compounds, there are given 3-methyl-4-amino-N,N-diethylaniline, 3-methyl-4-amino-N-ethyl-N-β-hydroxyethylaniline, 3-methyl-4-amino-N-ethyl-N-β-methanesulfonamidoethylaniline, 3-methyl-4-amino-N-ethyl-N-β-methoxyethylaniline; and sulfates, hydrochlorides and p-toluene sulfonates thereof. Two or more of these compounds can be used together according to the objects of the present invention.

In general, color developing solutions contain pH buffers such as carbonate of alkali metal, borate and phosphate, development retarders or antifoggants such as bromide, iodide, benzimidazoles, benzothiazole, and mercapto compounds. If desired, there are also used various preservatives such as hydroxyl amine, diethylhydroxyl amine, hydrazine sulfites and the like, phenylsemicarbazide and the like, triethanol amine, catechol sulfonic acid and the like, triethylene diamine(1,4-diazabicyclo[2,2,2]octane) and the like; organic solvents such as ethylene glycol and diethylene glycol; developing accelerators such as benzyl alcohol, polyethylene glycol, quaternary ammonium salt and amines; dye-forming couplers; competing couplers; fogging agents such as sodium boronhydride; auxiliary developing agents such as 1-phenyl-3-pyrazolidone; viscosity imparting agents; and various chelating agents such as aminopolycarboxylic acid, aminopolyphsphonic acid, alkylphosphonic acid, phosphonocarboxylic acid (e.g., ethylenediaminetetraacetic acid, nitrilotriacetic acid, diethylenetriaminepentaacetic acid, cyclohexanediaminetetraacetic acid, hydroxyethyliminodiacetic acid, 1-hydroxyethylidene-1,1-diphsphonic acid, nitrilo-N,N,N-trimethylenephosphonic acid, ethylenediamine-N,N,N'N'-tetramethylenephosphonic acid, ethylenediamine-di(o-hydroxyphenylacetic acid) and salts thereof).

Among the above-mentioned developing accelerators, the amount of benzyl alcohol is preferably restricted to the lower level in view of the protection of environment and the prevention of poor recoloring, and most preferably, benzyl alcohol is not used.

In a reversal process, black and white development is usually carried out as the first step and then followed by the step of color development. The black and white developing solutions can employ the well-known black and white developing agents, for example, dihydroxybenzenes such as hydroquinone, 3-pyrazolidones such as 1-phenyl-3-pyrazolidone, and aminophenols such as N-methyl-p-aminophenol alone or in combinations thereof.

Also, the use of the above-mentioned internal latent-image type silver halide emulsions can directly provide positive images without conducting any reversal process. In this case, fogging treatment is carried out by light or a nucleating agent when or before the color development is achieved.

These color developing and black and white developing solutions generally have a pH value of 9 to 12. The replenishment of these solutions is generally in an amount of 3 liters or less per 1 $m^2$ of photosensitive materials though depending on the sorts of color photosensitive materials to be treated and the amount can be decreased to 500 ml or less by lowering the concentration of bromide ions contained in the solution to be supplied. When the replenish amount of the developing solution is decreased, it is desirable to diminish the area made in contact with the air in a treating tank to prevent the evaporation and air oxidation of the solution. Further, the replenish amount of the developing solution can be lowered by means of restricting the accumulation of bromide ions in the developing solution.

The photosensitive emulsion layers are usually bleached after color-development. The bleaching treatment may be carried out simultaneously with the fixing treatment (bleach-fix treatment) or each treatment may be conducted independently. Moreover, in order to speed up the treatment, the bleach-fix treatment may be conducted after the bleaching treatment. Furthermore, according to the objects of the present invention, there can be arbitrarily conducted the continuous two-tank bleach-fix bath treatment, the fix treatment after bleach-fix treatment or the bleach treatment after bleach-fix treatment.

The bleaching agents used in the present invention include multivalent metal compounds such as iron (III) compound, cobalt (III) compound, chrome (VI) compound and copper (II) compound; peracids, quinones and nitro compounds. The typical bleaching agents to be used in the present invention include ferricyanide; dichromates; organic complex salts of iron (III) or cobalt (III) such as complex salts of aminopolycarboxylic acids (e.g., ethylenediaminetetraacetic acid, diethylenetriaminepentaacetic acid, cyclohexanediaminetetraacetic acid, methyliminodiacetic acid, 1,3-diaminopropanetetraacetic acid, and glycoletherdiaminetetraacetic acid); citric acid, tartaric acid or malic acid; persulfates; bromates; permanganates; and nitrobenzenes. Among these compounds, aminopolycarboxylic acid iron (III) complex salts such as ethylenediaminetetraacetic acid iron (III) complex salt and persulfates are preferable in view of the quick treatment and the prevention of environmental pollution. Moreover, aminopolycarboxylic acid iron (III) complex salt is particularly useful in a bleaching solution and in a bleach-fix bath. The bleaching solutions or bleach-fix baths using these aminopolycarboxylic acid iron (III) complex salts have a pH of 5.5 to 8, which can be lowered for the purpose of accelerating the process of treatment.

The bleaching solutions, bleach-fix baths and prebaths thereof can employ bleach-accelerators, if desired. The examples of useful bleach-accelerators are disclosed in the following specifications: namely, the compounds having a mercapto group or a disulfide disclosed in U.S. Pat. No. 3,893,858, West German Patent Nos. 1,290,812 and 2,059,988, JP-A No. 53-32736, JP-A No. 53-57831, JP-A No. 53-37418, JP-A No. 53-72623, JP-A No. 53-95630, JP-A No. 53-95631,JP-A No. 53-10423, JP-A No. 53-124424, JP-A No. 53-141623, JP-A No. 53-28426, *Research Disclosure* No. 17129 (July, 978); thiazolidine derivatives disclosed in JP-A No. 50-40129; thiourea derivatives disclosed in JP-B-45-8506 (the term "JP-B" as used herein means an "examined Japanese patent publication"), JP-A No. 52-20832, JP-A No. 53-2735 and U.S. Pat. No. 3,706,561; iodides disclosed in West German Patent No. 1,127,715, and JP-A No. 58-16235; polyoxyethylene compounds disclosed in West German Patents 966,410 and 2,748,430; polyamine compounds disclosed in JP-B-45-8836; the other compounds disclosed in JP-A No. 49-42434, JP-A No. 49-59644, JP-A No. 53-4927, JP-A No. 54-35727, JP-A No. 55-26506, and JP-A No. 58-163940 and ion bromides. Among these compounds, the compounds having a mercapto group or a disulfide group are preferable in view of the effect of acceleration, and the compounds disclosed in U.S. Pat. No. 3,893,858, West German Patent No. 1,290,812, and JP-A No. 53-95630 are particularly preferable. Moreover, the compounds disclosed in U.S. Pat. No. 4,552,834 are also preferable. These bleach-accelerators may be added into the photosensitive materials.

As the fixing agents, there are given thiosulfates, thiocyanates, thioether series compounds, thioureas, and various iodides. Thiosulfates are generally used, and particularly, ammonium thiosulfate can most widely be used. As the preservatives, sulfites, bisulfites or carbonyl bisulfite addition compounds are preferable.

The silver halide color photosensitive materials of the present invention are generally treated by the steps of washing and/or stabilizing after the desilvering step. The amount of water in the step of washing is widely determined according to various conditions such as the specific properties of photosensitive materials (raw materials such as couplers), uses, washing water temperature, number of washing tanks (number of steps), replenishing system such as the down-flow current and the countercurrent and so on.

Among these conditions, the relation between the number of washing tanks and the amount of water in the multistage countercurrent system can be obtained by the method disclosed in *Journal of Society of Motion Picture and Television Engineers,* Vol. 64, pages 248–253 (May, 1955).

According to the multistage countercurrent system disclosed in the above literature, the amount of washing water can exceedingly be decreased, but the longer stay of water in the tank causes problems such as the propagation of bacteria and the attachment of the grown floating creatures to the photosensitive materials. In order to solve such problems, the treatment of the color photosensitive materials of the present invention can utilize quite effectively the method of decreasing calcium ions and magnesium ions disclosed in JP-A No. 62-288838. Also, the present invention can use chlorine sterilizers such as isothiazolone compounds, thiabendazoles and chlorinated isocyanuric acid sodium, other benzotriazole and also the bactericides disclosed in *Bokin Bobai no Kaqaku* ("Chemistry of Bactericides and Fungicides") written by Hiroshi Horiguchi, *Biseibutsu no Mekkin, Sakkin, Bobai Gijutsu* ("Techniques of Sterilization, Pasteurization, and Fungicides of Microorganisms") edited by Eisei Gijutsu-kai ("Sanitary Technology Society"), *Bokin Bobaizai Jiten* ("Dictionary of Bactericides and Fungicides") edited by Nippon Bokin Bobai Gakkai ("Japan Bactericide and Fungicide Society").

In the processing of the photosensitive materials of the present invention, the pH value of washing water ranges from 4 to 9, preferably from 5 to 8. The washing temperature and time, depending on the specific properties and uses of the photosensitive materials, are generally selected from the range of 15 to 45° C. for 20 seconds to 10 minutes, preferably at 25 to 40° C. for 30 seconds to 5 minutes. Moreover, the photosensitive materials of the present invention can be treated directly with a stabilizing solution instead of said water washing. Such stabilizing treatment can employ all the known methods disclosed in JP-A No. 57-8543, JP-A No. 58-14834 and JP-A No. 60-220345.

Also, said water washing treatment may be followed by the stabilizing treatment.

The overflow solution by replenishment of said washing and/or stabilizing solution can be utilized again in the other steps such as a desilvering step etc.

The silver halide color photosensitive materials of the present invention may include color developing agents for the purpose of simplifying and accelerating the processing. In order to include the color developing agents, it is desirable to use various precursors, for example, indoaniline compounds disclosed in U.S. Pat. No. 3,342,597; Schiff base type compounds disclosed in U.S. Pat. No. 3,342,599, *Research Disclosure* Vol. 148, No. 14850 and Vol. 151, No. 15159; aldol compounds disclosed in *Research Disclosure,* No. 13924; metal salt complex disclosed in U.S. Pat. No. 3,719,492; and urethane compounds disclosed in JP-A No. 53-135628.

The silver halide color photosensitive materials of the present invention may include various 1-phenyl-3-pyrazolidones for the purpose of accelerating the color development, if desired. The typical compounds thereof are disclosed in JP-A No. 56-64339, JP-A No. 57-14454 and JP-A No. 58-115438.

In the present invention, various processing solutions are used at a temperature of 10° to 50° C., normally in the range of 33° to 38° C. However, the temperature may be raised to accelerate the processing and shorten the processing time or may be lowered to improve the image quality and the stability of the processing solutions. Also, the processing using cobalt or hydrogen peroxide intensification disclosed in West German Patent No. 2,226,770 or U.S. Pat. No. 3,674,499 may be carried out so as to curtail the amount of silver of photosensitive materials.

The present invention is illustrated in greater detail with reference to the following non-limiting examples.

EXAMPLE 1

10 g of a coupler (M-35) of the present invention, 20 g of a high boiling point coupler solvent (S-1) and 40 cc of ethyl acetate were dissolved at 60° C. to obtain a mixed solution. Then, the solution was added to a 50° C.-mixed solution consisting of 125 g of 6% gelatin aqueous solution and 8 cc of 5% dodecylbenzenesulfonic acid with stirring and then emulsified with a high-speed stirrer (homogenizer). Then, water was added to the above emulsified solution to obtain 400 g of a comparative emulsion (A) in total. The emulsion (A) had an average grain size of 0.16 $\mu$.

In a manner similar to the above, said coupler (M-35) was added to the high boiling point coupler solvent (S-1) and 1.2 g of the illustrated compound (I-2) of the present invention was used to obtain a comparative emulsion (B). In the same way, emulsions (C) to (F) were prepared according to Table 1. (The average grain sizes here were determined using NanoSizer made by COULTER CO., England.)

The emulsions (A) to (F) were allowed to stand with stirring in the sate of heat-melting (40° C.) and the stability thereof was examined after the lapse of time.

The result was shown in Table 1.

TABLE 1

| Emulsion | Coupler Kind | Coupler Amount (g) | Coupler Solvent Kind | Coupler Solvent Amount (g) | Compound (I) Kind | Compound (I) Amount (g) | Compound (II) Kind | Compound (II) (g) | Average Grain Size Immediately after preparation | After 24 hrs. | After 48 hrs. | After 72 hrs | Remarks |
|---|---|---|---|---|---|---|---|---|---|---|---|---|---|
| A | M-35 | 10 | S-1 | 20 | — | — | — | — | 0.15 | 0.18 | 0.19 | 0.20 | Comparison |
| B | M-35 | 10 | S-1 | 20 | I-2 | 1.2 | — | — | 0.14 | 0.19 | 0.20 | 0.23 | Comparison |
| C | M-35 | 10 | S-1 | 20 | I-2 | 1.2 | II-1 | 0.7 | 0.13 | 0.14 | 0.14 | 0.15 | Invention |
| D | M-35 | 10 | S-2 | 15 | I-4 | 1.6 | — | — | 0.14 | 0.16 | 0.19 | 0.25 | Comparison |
| E | M-35 | 10 | S-2 | 15 | I-4 | 1.6 | II-2 | 0.3 | 0.14 | 0.15 | 0.16 | 0.19 | Invention |
| F | M-35 | 10 | S-2 | 15 | I-4 | 1.6 | II-2 | 0.8 | 0.13 | 0.14 | 0.14 | 0.15 | Invention |

(S-1)

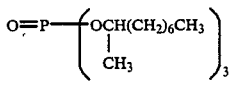

(S-2)

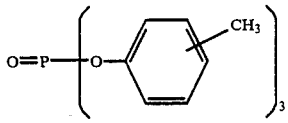

As is clearly shown in Table 1, comparative emulsions (A), (B) and (D) showed a tendency to increase the emulsion grain sizes as time went on. Particularly, there was a problem that the addition of the compounds of formula (I) enlarged the tendency. However, Table 1 revealed that said problem was solved by adding the compounds of formula (II) to obtain the emulsions containing the minute and highly stable oil droplets.

EXAMPLE 2

On a paper support laminated with polyethylene on both surfaces were prepared the following layers to obtain a multilayered photographic paper (1). The coating solutions were prepared as follows: (Preparation of the first layer coating solution)

10.2 g of yellow coupler (Y-1), 9.1 g of yellow coupler (Y-2), 2.1 g of dye image stabilizer (Cpd-2), 27.2 cc of ethyl acetate, and 15 cc of high boiling point solvent (S-2/S— =1/1 ) were dissolved to obtain a mixed solution. The resulting solution was emulsified and dispersed in 185 cc of 10% gelatin aqueous solution containing 8 cc of 10% sodium dodecylbenzenesulfonate. The resulting emulsified dispersion was mixed with emulsions EM1 and EM2, and the gelatin concentration was adjusted to have the following composition to obtain the first layer coating solution. The coating solutions of the second layer to the seventh layer were prepared in a manner similar to the above process of the first-layer coating solution. As the gelatin hardening agent, there was used 1-oxy-3,5-dichloro-s-triazine sodium salt.

As the thickener, there was used (Cpd-1).

Constitution of Layers

The following is the description as to the compositions of the layers. The numerical figures show the amounts of solutions coated (g/m$^2$). Silver halide emulsions are given in the conversion amounts of silver.

Support

Polyethylene-laminated paper (polyethylene on the first layer side contained a white pigment ($TiO_2$) and a bluish dye.)

First layer (blue-sensitive layer):

-continued

| | |
|---|---|
| Monodispersed silver chlorobromide emulsion spectrally sensitized with sensitizing dye (ExS-1):(EM1) | 0.13 |
| Monodispersed silver chlorobromide emulsion spectrally sensitized with sensitizing dye (ExS-1):(EM2) | 0.13 |
| Gelatin | 1.86 |
| Yellow coupler (Y-1) | 0.44 |
| Yellow coupler (Y-2) | 0.39 |
| Dye image stabilizer (Cpd-2) | 0.08 |
| Solvent (S-2) | 0.35 |
| Solvent (S-3) | 0.35 |
| Color mixing preventing agent (Cpd-18) | 0.01 |
| Second Layer (dye-mix-preventing layer) | |
| Gelatin | 0.99 |
| Color mixing preventing agent (Cpd-3) | 0.08 |
| Third Layer (green-sensitive layer) | |
| Monodispersed silver chlorobromide emulsion spectrally sensitized with sensitizing dye (ExS-2, 3):(EM3) | 0.05 |
| Monodispersed silver chlorobromide emulsion spectrally sensitized with sensitizing dye (ExS-2, 3):(EM4) | 0.11 |
| Gelatin | 1.80 |
| Magenta coupler (M-35) | 0.39 |
| Dye image stabilizer (Cpd-4) | 0.20 |
| Dye image stabilizer (Cpd-6) | 0.03 |
| Solvent (S-2) | 0.12 |
| Solvent (S-4) | 0.25 |
| Fourth Layer (ultraviolet ray absorbing layer) | |
| Gelatin | 1.60 |
| Ultraviolet ray absorbing agent (Cpd-7/Cpd-9/Cpd-16 = 3/2/6: weight ratio) | 0.70 |
| Color mixing preventing agent | 0.05 |
| Solvent (S-5) | 0.27 |
| Fifth Layer (red-sensitive layer) | |
| Monodispersed silver chlorobromide emulsion spectrally sensitized with sensitizing dye (ExS-4, 5):(EM5) | 0.07 |
| Monodispersed silver chlorobromide emulsion spectrally sensitized with sensitizing dye (ExS-4, 5):(EM6) | 0.16 |
| Gelatin | 1.12 |
| Cyan coupler (C-2) | 0.32 |
| Dye image stabilizer (Cpd-8/Cpd-9/Cpd-10 = 3/4/2: weight ratio) | 0.17 |
| Color mixing preventing agent (Cpd-18) | 0.02 |
| Color mixing preventing agent (Cpd-3) | 0.02 |
| Dye image stabilizer (Cpd-5) | 0.30 |
| Solvent (S-2) | 0.10 |
| Solvent (S-3) | 0.10 |
| Solvent (S-6) | 0.10 |
| Six Layer (ultraviolet ray absorbing layer) | |
| Gelatin | 0.54 |
| Ultraviolet ray absorbing agent (Cpd-7/Cpd-8/Cpd-9 = 1/5/3: weight ratio) | 0.21 |
| Solvent (S-5) | 0.08 |

-continued

| Seventh Layer (protective layer) | |
|---|---|
| Gelatin | 1.33 |
| Acryl-denatured copolymer of polyvinyl alcohol (denatured degree: 17%) | 0.17 |
| Liquid paraffin | 0.03 |

In this case, Cpd-12 and Cpd-13 were used as the irradiation-preventing dyes.

Moreover, each layer contained emulsification dispersants and coating aids such as Alkanol XC (Du Pont), sodium alkylbenzenesulfonate, succinic acid ester and Megafac F-120 (made by Dainippon Ink and Chemicals, Incorporated). As the stabilizers of silver halide were used Cpd-14, 15, 17.

| Emulsion | Form | Average grain size *1 (μ) | Br content (mol %) | Variation coefficient *2 |
|---|---|---|---|---|
| EM1 | Cube | 1.0 | 80 | 0.08 |
| EM2 | " | 0.75 | 80 | 0.07 |
| EM3 | " | 0.5 | 83 | 0.09 |
| EM4 | " | 0.4 | 83 | 0.10 |
| EM5 | " | 0.5 | 73 | 0.09 |
| EM6 | " | 0.4 | 73 | 0.10 |

*1: In this case, the edge length is given by the average on the basis of the projected area.

*2: The variation coefficient is given by a ratio ($s/\bar{d}$) of the statistically standard deviation (s) and the average grain size ($\bar{d}$).

Cpd-1

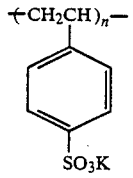

Cpd-2

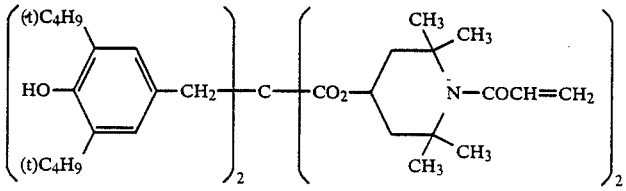

Cpd-3

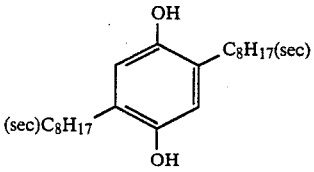

Cpd-4

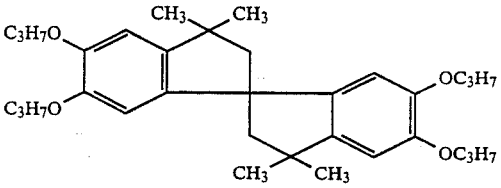

Cpd-5

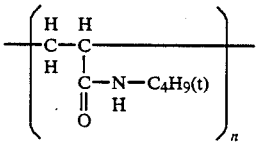

(number average molecular weight: 50,000)

Cpd-6

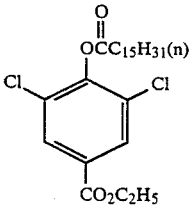

-continued
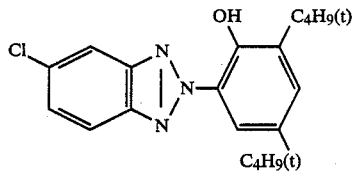
Cpd-7
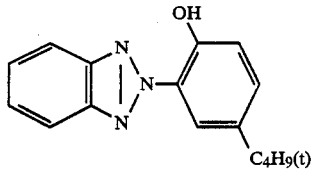
Cpd-8
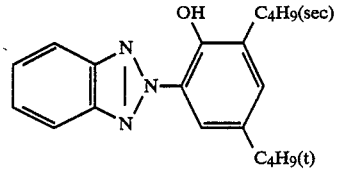
Cpd-9
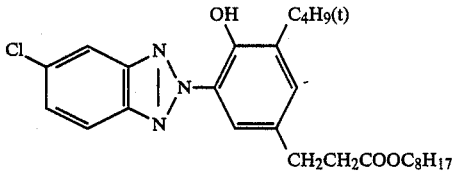
Cpd-10
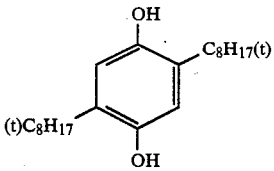
Cpd-11
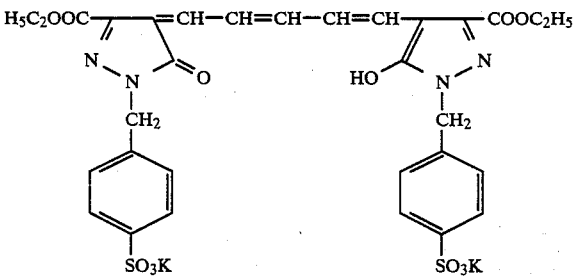
Cpd-12
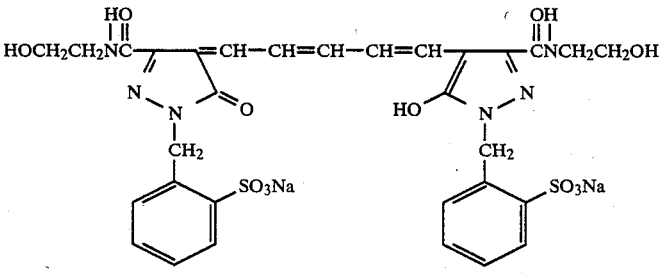
Cpd-13
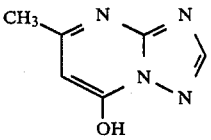
Cpd-14

-continued
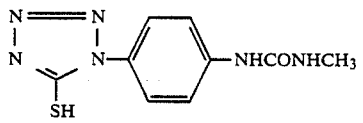
Cpd-15
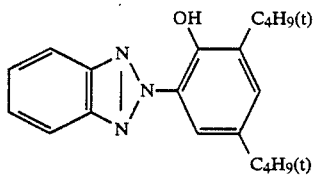
Cpd-16
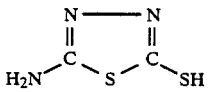
Cpd-17
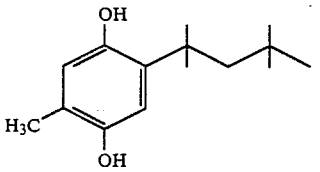
Cpd-18
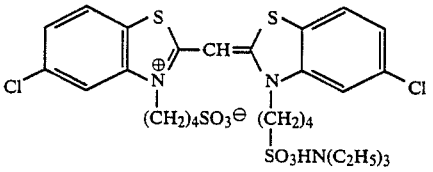
ExS-1
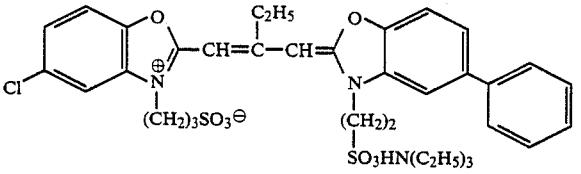
ExS-2
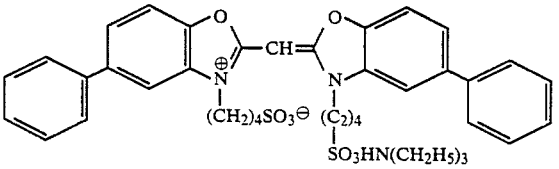
ExS-3
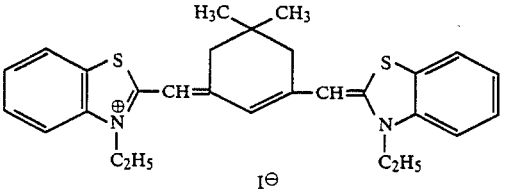
ExS-4
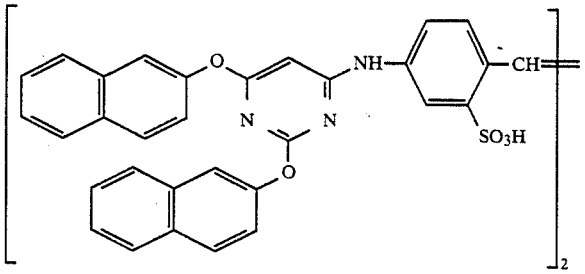
ExS-5

-continued (S-3)

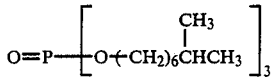

(S-4)

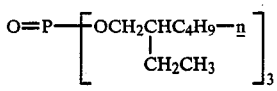

(S-5)

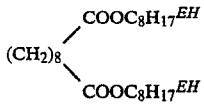

(S-6)

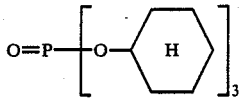

Then, the multilayered photographic papers (2) to (8) were prepared in a manner similar to the process of the multilayered photographic paper (1) except the following modified points (green-sensitive layer) shown in Table 2.

TABLE 2

(modified points added to photographic paper (1))

| Photographic paper | Green-sensitive layer | Remarks |
|---|---|---|
| (1) | — | Comparison |
| (2) | I-2 (30 mg/m$^2$) was further added. | Comparison |
| (3) | I-2 (30 mg/m$^2$) and II-1 (5 mg/m$^2$) were further added. | Invention |
| (4) | I-2 (30 mg/m$^2$) and II-1 (15 mg/m$^2$) were further added. | Invention |
| (5) | I-2 (30 mg/m$^2$), II-1 (15 mg/m$^2$) and A-12 (20 mg/m$^2$) were further added. | Invention |
| (6) | I-3 (25 mg/m$^2$) was further added. | Comparison |
| (7) | I-3 (25 mg/m$^2$) and II-8 (20 mg/m$^2$) were further added. | Invention |
| (8) | I-3 (25 mg/m$^2$), II-8 (20 mg/m$^2$) and A-11 (10 mg/m$^2$) were further added. | Invention |

The above-mentioned photosensitive materials were exposed to light through optical wedge and then processed by the following steps.

| Processing steps | Temperature | Time |
|---|---|---|
| Color development | 38° C. | 100 sec |
| Bleach-fix | 30–34° C. | 60 sec |
| Rinse 1 | 30–34° C. | 20 sec |
| Rinse 2 | 30–34° C. | 20 sec |
| Rinse 3 | 30–34° C. | 20 sec |
| Dry | 70–80° C. | 50 sec |

(A three-tank countercurrent system from Rinse 3 to Rinse 1 was used.)

| Color developing solution | |
|---|---|
| Water | 800 ml |
| Diethylenetriaminepentaacetic acid | 1.0 g |
| 1-Hydroxyethylidene-1,1-diphosphonic acid (60%) | 2.0 g |
| Nitrilotriacetic acid | 2.0 g |
| Benzyl alcohol | 16 ml |
| Diethylene glycol | 10 ml |
| Sodium sulfite | 2.0 g |
| Potassium bromide | 0.5 g |

-continued

| | |
|---|---|
| Potassium carbonate | 30 g |
| N—ethyl-N—(β-methanesulfonamidoethyl)-3-methyl-4-aminoaniline sulfate | 5.5 g |
| Hydroxylamine sulfate | 3.0 g |
| Brightening agent (WHITEX 4B made by Sumitomo Chemical Co., Ltd.) | 1.5 g |
| Water to make | 1000 ml |
| pH (25° C.) | 10.25 |
| **Bleach-fix bath** | |
| Water | 400 ml |
| Ammonium thiosulfate (70%) | 200 ml |
| Sodium sulfite | 20 g |
| Ammonium ethylenediaminetetraacetato ferrate | 60 g |
| Disodium ethylenediaminetetraacetate | 10 g |
| Water to make | 1000 ml |
| pH (25° C.) | 7.00 |
| **Rinse solution** | |
| Benzotriazole | 1.0 g |
| Ethylenediamine-N,N,N',N'-tetramethylene-phosphonic acid | 0.3 g |
| Water to make | 1000 ml |
| pH (25° C.) | 7.50 |

Next, each of the obtained specimens was developed and allowed to stand for one hour. Then, the reflection density thereof was determined by green light. The maximum density was obtained from the resulting characteristic curve. The result was shown in Table 3. Then, some specimens were allowed to stand for two weeks under 50° C.–70%RH and the other specimens were allowed to stand at room temperature for 50 days. Concerning these two groups of specimens, the increase of magenta densities in the non-image parts (stains) was observed as shown in Table 3.

TABLE 3

| Photographic paper | Maximum density | Increase of stain density in non-image part: 50° C.-70% RH for 2 weeks | Increase of stain density in non-image part: Room temperature | Remarks |
|---|---|---|---|---|
| 1 | 2.42 | 0.14 | 0.09 | Comparison |
| 2 | 2.28 | 0.03 | 0.01 | Comparison |
| 3 | 2.42 | 0.03 | 0.01 | Invention |
| 4 | 2.46 | 0.02 | 0.01 | Invention |
| 5 | 2.45 | 0.01 | 0.00 | Invention |
| 6 | 2.29 | 0.04 | 0.01 | Comparison |
| 7 | 2.44 | 0.03 | 0.01 | Invention |
| 8 | 2.46 | 0.01 | 0.01 | Invention |

It is clearly shown in Table 3 that the addition of the compounds of formula (I) exceedingly decreases the magenta stain density after the lapse of time after the processing, but also unwillingly lowers the maximum density; while the employment of the compounds of formula (II) with those of formula (I) can effectively prevent the formation of the magenta stain in the non-image parts without lowering the maximum density. Furthermore, it is apparent that the addition of the compounds of formula (A-I) or (A-II) can also prevent the formation of the stains. Also, the blue-sensitive layer and the red-sensitive layer can obtain the same effect as in the case of the green-sensitive layer.

EXAMPLE 3

Photographic papers were prepared in a manner similar to Example 2 except that the following silver halide emulsions EM7 to EM12 were used instead of the silver halide emulsions EMl to EM6 used in Example 2. These photographic papers were treated by the following steps and tested as to the blue-sensitive layer, the green-sensitive layer and the red-sensitive layer to obtain the results similar to Example 2.

| Emulsion | Form | Average grain size *1 (μ) | Br content (mol %) | Variation coefficient *2 |
|---|---|---|---|---|
| EM7 | Cube | 1.1 | 1.0 | 0.10 |
| EM8 | " | 0.8 | 1.0 | 0.10 |
| EM9 | " | 0.45 | 1.5 | 0.09 |
| EM10 | " | 0.34 | 1.5 | 0.09 |
| EM11 | " | 0.45 | 1.5 | 0.09 |
| EM12 | " | 0.34 | 1.6 | 0.10 |

*1: The same definition as given in Example 2.
*2: The same definition as given in Example 2.

| Processing steps | Temperature | Time |
|---|---|---|
| Color development | 35° C. | 45 sec |
| Bleach-fix | 30–35° C. | 45 sec |
| Rinse 1 | 30–35° C. | 20 sec |
| Rinse 2 | 30–35° C. | 20 sec |
| Rinse 3 | 30–35° C. | 20 sec |
| Rinse 4 | 30–35° C. | 30 sec |
| Dry | 70–80° C. | 60 sec |

(A four-tank countercurrent system from Rinse 4 to Rinse 1 was used.)

The composition of each processing salt is given as follows:

| | |
|---|---|
| Color developing solution | |
| Water | 800 ml |
| Ethylenediamine-N,N,N,N—tetramethylene-phosphonic acid | 1.5 g |
| Triethylenediamine(1,4-diaza cyclo-[2,2,2]octane) | 5.0 g |
| Sodium chloride | 1.4 g |
| Potassium carbonate | 25 g |
| N—ethyl-N—(β-methanesulfonamidoethyl)-3-methyl-4-aminoanilinesulfate | 5.0 g |
| N,N—diethylhydroxylamine | 4.2 g |
| Brightening agent (UVITEX CK of Ciba Geigy AG) | 2.0 g |
| Water to make | 1000 ml |
| pH (25° C.) | 10.10 |
| Bleach-fix bath | |
| Water | 400 ml |
| Ammonium thiosulfate (70%) | 100 ml |
| Sodium sulfite | 18 g |
| Ammonium ethylenediaminetetraacetato ferrate | 55 g |
| Disodium ethylenediaminetetraacetate | 3 g |
| Ammonium bromide | 40 g |
| Glacial acetic acid | 8 g |
| Water to make | 1000 ml |
| pH (25° C.) | 5.5 |
| Rinse solution | |
| Ion-exchange solution (the concentrations of calcium and magnesium are 3 ppm or less.) | |

The combined use of the compounds of formulae (I) and (II) can effectively control the generation of stains on the developed white ground after the lapse of time without substantially lowering the maximum color density.

Therefore, color photographs can be exhibited or preserved for a long time without impairing the excellent image quality.

While the invention has been described in detail and with reference to specific embodiments thereof, it will be apparent to one skilled in the art that various changes and modifications can be made therein without departing from the spirit and scope thereof.

What is claimed is:

1. A silver halide color photosensitive material, characterized in that a lipophilic fine grain dispersed in at least one hydrophilic colloidal layer formed on a support contains at least one compound represented by formula (I) and at least one compound represented by formula (II):

$$R_1—SO_2·M_1 \quad (I)$$

$$R_2—SO_3·M_2 \quad (II)$$

wherein each of $R_1$ and $R_2$ represents an aliphatic, aromatic or heterocyclic group having 8 or more carbon atoms; each of $M_1$ and $M_2$ represents a hydrogen atom or an inorganic or organic salt-forming atom or atomic group; also $M_1$ represents a protective group to be hydrolyzed with alkali, and sodium dodecylbenzenesulfonate is excluded from the compounds of formula (II).

2. A silver halide color photosensitive material as claimed in claim 1, wherein each of $R_1$ and $R_2$ in said formulae (I) and (II) represents an aromatic group having 10 or more carbons.

3. A silver halide color photosensitive material as claimed in claim 1, wherein $R_1$ and $R_2$ in said formulae (I) and (II) are the same.

4. A silver halide color photosensitive material as claimed in claim 2, wherein $R_1$ and $R_2$ in said formulae (I) and (II) are the same.

* * * * *